US012729005B2

(12) United States Patent
Wittmann et al.

(10) Patent No.: US 12,729,005 B2
(45) Date of Patent: Sep. 8, 2026

(54) ENERGY CONVERSION ARRANGEMENT, ENERGY SYSTEM AND AIRCRAFT COMPRISING SAME

(71) Applicants: Airbus Operations GmbH, Hamburg (DE); Airbus Operations SAS, Toulouse (FR)

(72) Inventors: Tim Wittmann, Hamburg (DE); Florian Thorey, Toulouse (FR)

(73) Assignees: AIRBUS OPERATIONS GMBH, Hamburg (DE); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/987,902

(22) Filed: Dec. 19, 2024

(65) Prior Publication Data

US 2025/0207538 A1 Jun. 26, 2025

(30) Foreign Application Priority Data

Dec. 21, 2023 (EP) .................................... 23290051
Aug. 7, 2024 (DE) ......................... 102024122542.4
(Continued)

(51) Int. Cl.
*B64D 27/355* (2024.01)
*F02C 9/18* (2006.01)
*B64D 41/00* (2006.01)

(52) U.S. Cl.
CPC .............. *B64D 27/355* (2024.01); *F02C 9/18* (2013.01); *B64D 2041/005* (2013.01); *H01M 2250/20* (2013.01); *Y02T 90/40* (2013.01)

(58) Field of Classification Search
CPC ............ B64D 27/355; B64D 2041/005; B64D 3333/04; F02C 9/18; H01M 2250/20; Y02T 90/40
See application file for complete search history.

(56) References Cited

U.S. PATENT DOCUMENTS 5,005,355 A 4/1991 Singh
7,971,438 B2 7/2011 Taylor et al.
(Continued)

FOREIGN PATENT DOCUMENTS

DE 102021004031 A1 2/2023
EP 2150692 A2 2/2010
(Continued)

OTHER PUBLICATIONS

European Search Report for corresponding European Patent Application No. 24290026.4 dated Jan. 28, 2025.
(Continued)

*Primary Examiner* — Phutthiwat Wongwian
*Assistant Examiner* — Rene D Ford
(74) *Attorney, Agent, or Firm* — Greer, Burns & Crain, Ltd.

(57) ABSTRACT

An energy conversion arrangement for an aircraft, an energy system and an aircraft including an energy conversion arrangement and/or an energy system are provided. The energy conversion arrangement includes a fuel conversion device, in particular a fuel cell system, for converting at least one fuel to electrical and/or mechanical energy; an expansion device arranged in a flow path of exhausts produced in the fuel conversion device and configured to decompress the exhausts; an exhaust outlet for letting out exhausts produced in the fuel conversion device by the fuel conversion; and at least one bypass duct configured to allow the exhausts to bypass the expansion device on their way from the fuel conversion device to the exhaust outlet.

13 Claims, 8 Drawing Sheets

(30) Foreign Application Priority Data

| | | |
|---|---|---|
| Aug. 7, 2024 | (DE) | 102024122543.2 |
| Aug. 7, 2024 | (DE) | 102024122544.0 |
| Aug. 7, 2024 | (DE) | 102024122546.7 |
| Aug. 7, 2024 | (DE) | 102024122550.5 |
| Aug. 7, 2024 | (DE) | 102024122551.3 |
| Aug. 7, 2024 | (EP) | 24290026 |
| Aug. 7, 2024 | (EP) | 24290027 |
| Aug. 7, 2024 | (EP) | 24290028 |
| Aug. 7, 2024 | (EP) | 24290029 |

(56) References Cited

U.S. PATENT DOCUMENTS

| | | | | |
|---|---|---|---|---|
| 8,402,736 | B2 | 3/2013 | Noppel et al. | |
| 9,174,740 | B2 | 11/2015 | Stolte et al. | |
| 11,420,757 | B2 | 8/2022 | Clarke et al. | |
| 11,565,607 | B2 | 1/2023 | Mikic et al. | |
| 11,579,050 | B2 | 2/2023 | Farouz-Fouquet | |
| 11,643,220 | B2 | 5/2023 | Poirier | |
| 11,876,263 | B1 | 1/2024 | Wang et al. | |
| 2008/0072577 | A1 | 3/2008 | Taylor et al. | |
| 2015/0260097 | A1 | 9/2015 | Fujita | |
| 2017/0077534 | A1 | 3/2017 | Guidry et al. | |
| 2017/0170494 | A1 | 6/2017 | Lents et al. | |
| 2019/0372140 | A1* | 12/2019 | Hayase | H01M 8/24 |
| 2020/0171429 | A1 | 6/2020 | Giroud et al. | |
| 2021/0206502 | A1 | 7/2021 | Boufford et al. | |
| 2021/0207500 | A1 | 7/2021 | Klingels et al. | |
| 2022/0255162 | A1* | 8/2022 | Lambourne | H01M 10/625 |
| 2023/0120297 | A1 | 4/2023 | Butler | |
| 2023/0187662 | A1 | 6/2023 | Prince et al. | |
| 2024/0186541 | A1 | 6/2024 | Horde et al. | |
| 2024/0200494 | A1 | 6/2024 | Lear | |

FOREIGN PATENT DOCUMENTS

| | | | |
|---|---|---|---|
| EP | 2153043 | A2 | 2/2010 |
| EP | 3961012 | A1 | 3/2022 |
| EP | 4574660 | A1 | 6/2025 |
| WO | 2010084525 | A1 | 7/2010 |
| WO | 2022212575 | A1 | 10/2022 |
| WO | 2022232828 | A1 | 11/2022 |
| WO | 2023239965 | A2 | 12/2023 |
| WO | 2023246980 | A1 | 12/2023 |

OTHER PUBLICATIONS

European Search Report for corresponding European Patent Application No. 24290027.2 dated Jan. 28, 2025.

European Search Report for corresponding European Patent Application No. 24290028.0 dated Jan. 28, 2025.

European Search Report for corresponding European Patent Application No. 24290029.8 dated Jan. 28, 2025.

European Search Report for corresponding European Patent Application No. 24216787.2 dated Mar. 28, 2025.

European Search Report for corresponding European Patent Application No. 24214240.4 dated Mar. 28, 2025.

European Search Report for corresponding European Patent Application No. 24214238.8 dated Mar. 28, 2025.

Wikipedia, "Turbofan" retrieved from the Internet on Dec. 13, 2023 from https://web.archive.org/web/20231213114010/https://en.wikipedia.org/wiki/Turbofan.

European Search Report for corresponding European Patent Application No. 24221585.3 dated Apr. 3, 2025.

European Search Report for corresponding European Patent Application No. 23290050.6 dated Apr. 30, 2024.

H. Cruz et al., "Multifunctional Fuel Cell System for Civil Aircraft: Study of the Cathode Exhaust Gas Dehumidification" International Journal of Hydrogen Energy, vol. 42, Issue 49, 2017, pp. 29518-29531, ISSN 0360-3199, retrieved from https://doi.org/10.1016/j.ijhydene.2017.09.175.

Teymourtash et al., "The Effects of Rate of Expansion and Injection of Water Droplets on the Entropy Generation of Nucleating Steam Flow in a Laval Nozzle", Heat Mass Transfer (2009) 45:1185-1198, p. 1196.

European Search Report for corresponding European Patent Application No. 25190344 dated Dec. 12, 2025; 11 pages.

* cited by examiner

ENERGY CONVERSION ARRANGEMENT, ENERGY SYSTEM AND AIRCRAFT COMPRISING SAME

CROSS-REFERENCES TO RELATED APPLICATIONS

This application claims the benefit of the European patent application No. 23290051.4 filed on Dec. 21, 2023, and of the European patent application No. 24290026.4 filed on Aug. 7, 2024 and of the European patent application No. 24290027.2 filed on Aug. 7, 2024, and of the German patent application No. 102024122550.5 filed on Aug. 7, 2024, and of the German patent application No. 102024122543.2 filed on Aug. 7, 2024, and of the German patent application No. 102024122542.4 filed on Aug. 7, 2024, and of the German patent application No. 102024122544.0 filed on Aug. 7, 2024, and of the German patent application No. 102024122546.7 filed on Aug. 7, 2024, and of the German patent application No. 102024122551.3 filed on Aug. 7, 2024, and of the European patent application No. 24290028.0 filed on Aug. 7, 2024, and of the European patent application No. 24290029.8 filed on Aug. 7, 2024, the entire disclosures of which are incorporated herein by way of reference.

FIELD OF THE INVENTION

The present disclosure relates to the field of anthropogenic climate change due to cloudiness caused by contrails produced by energy systems of aircraft. In particular, the disclosure relates to an energy conversion arrangement for an aircraft, an energy system, in particular for powering a propulsion unit for propelling an aircraft, and to an aircraft comprising an energy conversion arrangement and/or an energy system.

BACKGROUND OF THE INVENTION

Conventional aircraft engines emit water vapor and soot particles. The plume of the conventional engine mixes with ambient air and the temperature decreases. This leads to a water vapor supersaturation and subsequent droplet formation on the soot particles. These droplets freeze and hence form contrails. In ice-supersaturated regions (ISSR), contrails persist for a long time and contribute to global warming.

For several reasons, hydrogen powered fuel cell aircraft are an interesting alternative to conventional aircraft propulsion and also for power generation, in that they may replace conventional auxiliary power units (APUs). In particular, they emit no carbon dioxide and thus are seen as a potential pathway to a more sustainable aviation. However, they emit large amounts of water. If this water is able to form persistent contrails, it contributes to global warming.

Fuel cells emit no soot particles. Due to the low concentration of ambient aerosols, only a few droplets can form through heterogeneous nucleation. Instead, most droplets form through homogeneous nucleation during which molecules condensate and form nuclei without the presence of foreign ions or particles. Homogeneous nucleation can occur inside the fuel cell system, e.g., in a turbine or a nozzle, or in the plume during mixing and cooling with ambient air. The occurrence and place of homogeneous nucleation depends on the system architecture, operating conditions and ambient conditions. Homogeneous nucleation leads to a high concentration of small droplet radii, often below one micron. If the droplets freeze to persistent ice crystals, the resulting contrail might have a stronger climate impact than a contrail of a conventional aircraft engine. Therefore, it is important to reduce the contrail formation of fuel cell aircraft as much as possible or avoid it altogether.

EP 3 961 012 A1, for example, relates to an aircraft flight contrail assessment device comprising a contrail sensor adapted to produce contrails data representative of an atmosphere parameter having an influence on the formation of contrails or an observation parameter varying depending on at least the presence of one or more contrails, and a processing unit adapted to calculate at least a contrails value representative of an amount of contrail, based on the contrails data. The invention provides such device as well a corresponding method to evaluate the amount of contrails produced by an aircraft during a flight.

U.S. Pat. No. 11,579,050 B2 relates to a system, configured for being on board an aircraft. The system includes a probe for collecting samples of contrail, a chamber for collecting the samples, a collecting conduit for conducting the samples from the collecting probe the collecting chamber and at least one device for measuring at least one parameter characterizing the samples in the collecting conduit while they are conducted from the collecting probe to the collecting chamber. By virtue of the system, it is not necessary to use a second aircraft that follows the aircraft for collecting samples of contrail.

U.S. Pat. No. 5,005,355 A describes a method of suppressing the formation of contrails from the exhaust of an engine operating in cold temperatures including the steps of providing a combined nucleating agent and freeze-point depressant selected from the group of water soluble monohydric, dihydric, trihydric or other polyhydric alcohols, or mixtures thereof, forming the solution into a vapor, and injecting the solution into the exhaust of the engine. The solution may include a non-corrosive surfactant. Another solution may include an organic or an inorganic nucleating agent, or mixtures thereof, in monohydric, dihydric, or polyhydric alcohols, or mixtures thereof, and in addition may contain one or more surfactants.

EP 2 150 692 A2 describes an aircraft comprising a gas turbine engine that exhausts a plume of gases in use, the aircraft comprises an ultrasound generator having an ultrasonic actuator and a waveguide to direct ultrasonic waves at the exhaust plume to avoid the formation of contrails.

EP 2 153 043 A2 describes a method of operating an aircraft, and the aircraft itself, comprising a gas turbine engine that exhausts a plume of gases in use, the aircraft is characterized by comprising an electromagnetic radiation generator and a waveguide to direct electromagnetic radiation at the exhaust plume to avoid the formation of contrails.

U.S. Pat. No. 7,971,438 B2 deals with the provision of a condensation stage in a heat exchanger arrangement for a gas turbine engine the level of condensation within a final exhaust gas flow from an engine is reduced. Furthermore, by cooling of the exhaust gas flows for mixing with by-pass air flows a water partial pressure at an exhaust gas exit temperature can be provided which is below the eutectic liquid to vapor phase transition and therefore avoid condensation (contrail) formation.

H. Cruz Champion, S. Kabelac, "Multifunctional fuel cell system for civil aircraft: Study of the cathode exhaust gas dehumidification", International Journal of Hydrogen Energy, Volume 42, Issue 49, 2017, Pages 29518-29531, ISSN 0360-3199, (https://doi.org/10.1016/j.ijhydene.2017.09.175) describe a cathode exhaust gas dehumidification system based on an air cycle machine (compressor, heat exchanger, cyclone, turbine) which supplies liquid water and dry oxygen depleted air (ODA).

Systems and methods for reducing contrails, as known from the prior art, do not satisfy all requirements for contrail reduction on aircraft. The known systems require additional installation, space, weight, and power offtake. Moreover, the known systems cannot necessarily be applied to alternative fuel conversion technologies, such as fuel cells.

SUMMARY OF THE INVENTION

It may thus be seen as an object to reduce climate impacts of aviation operations due to contrail formation. In other words, it can be seen as an object, to provide a contrail reduction or at least negative effects of contrails, preferably also for any contrails produced by alternative fuel conversion technologies, such as fuel cells.

In particular, an energy conversion arrangement for an aircraft is provided, comprising a fuel conversion device, in particular a fuel cell system, for converting at least one fuel to electrical and/or mechanical energy; an expansion device arranged in a flow path of exhausts produced in the fuel conversion device and configured to decompress the exhausts; an exhaust outlet for letting out exhausts produced in the fuel conversion device by the fuel conversion; and at least one bypass duct configured to allow the exhausts to bypass the expansion device on their way from the fuel conversion device to the exhaust outlet.

An energy system, in particular for powering a propulsion unit for propelling an aircraft, is provided, comprising a corresponding energy conversion arrangement. The energy system may comprise the propulsion unit. The energy system may be provided as an engine and/or power plant for an aircraft.

An aircraft is provided comprising a corresponding energy conversion arrangement and/or a corresponding energy system.

In a typical air supply system of a fuel conversion device, such as a fuel cell, ambient air is compressed and fed to the fuel conversion device. After the fuel conversion device, the now humid air is typically expanded in an expansion device, such as a turbine, and then emitted back to the ambient. The bypass duct can connect to any duct defining the flow path and/or any kind of source of the exhausts upstream of the expansion device and thus enable relatively humid exhausts from the fuel conversion device, such as air from a fuel cell, to partially, or completely bypass the expansion device, such as a turbine. Hence no or at least far less enthalpy is withdrawn from the fluid exhausts in comparison to if they are being decompressed in the expansion device.

A certain expansion in the bypass, e.g., in a valve or nozzle, may be inevitable, such that some droplets might form. This is due to the high saturation caused by the low static temperature which is a result of the high flow velocities during expansion. Consequently, the droplets will partly or completely evaporate when the flow is decelerated. However, when the flow of exhausts is decelerated, the static temperature rises again, as the total temperature remains unchanged. This will lead to a partial or complete evaporation of the droplets formed in the bypass. Hence, fewer droplets are emitted, and the contrail contribution of the energy conversion arrangement is reduced. Contrary to that, when being decompressed in the expansion device, for example, a turbine, the droplets might not evaporate, as the expansion device withdraws enthalpy and hence reduces the total temperature of the flow.

The solution particularly allows for bypassing the expansion device during flight through ISSR where persistent contrails can form. In this way, no enthalpy is withdrawn from the humid exhaust air and its total temperature remains unchanged. Hence, under stagnation conditions, the saturation temperature remains unchanged, and therefore, no droplets are formed. A main advantage of the solution may thus be seen in allowing to bypass any component of the energy conversion arrangement, which under respective conditions has a strong contrail contribution. The emission of fewer or no droplets from the exhaust outlet reduces the contrail impact of the energy conversion system.

Furthermore, for example, if the expansion device comprises a turbine, bypassing the expansion device may help to prevent the turbine from stalling or blocking in case of an overload by a certain mass flow and/or volumetric flow of exhausts entering the turbine. The bypass duct can thus also be used for regulating the turbine and/or operating it in a desired operating range. The bypass duct may additionally help to prevent unwanted condensation of water vapor contained in the exhausts within the turbine. This is particularly the case, if any means, such as a heating device and/or heat exchange device arranged upstream of the expansion device is not present, not enabled or does not provide an amount of heat to the exhausts sufficient for avoiding the condensation.

The proposed solution provides a reduction of contrail formation for all kinds of aircraft, including but not limited to fuel cell aircraft. This includes energy systems for aircraft comprising fuel cells for aircraft propulsion and/or as APUs. Compared to the prior art, the proposed solution is lighter, cheaper, uses less space and power and creates no new emissions. The proposed solution allows for mitigating a possible disadvantage of fuel cell powered aircraft by reducing their contribution to contrail production, and thus enhancing their environmental friendliness.

Further developments can be derived from the following description. Features described with reference to devices and arrangements may be implemented as method steps, or vice versa. Therefore, the description provided in the context of the energy conversion arrangement, energy system and/or aircraft applies in an analogous manner also to respective methods. In particular, the functions of the energy conversion arrangement, energy system and/or aircraft and of their or its, respectively, components may be implemented as method steps of the methods and the method steps may be implemented as functions of the energy conversion arrangement, energy system and/or aircraft.

According to an aspect of an energy conversion arrangement, the bypass duct connects to the flow path via a junction. The junction may be located and shaped such that it enables to advantageously branch off and/or completely guide the exhausts such that they are led through the bypass duct. Thereby, the junction helps in improving operation and flexibility of the energy conversion arrangement.

According to an aspect of an energy conversion arrangement, the junction comprises at least one switch valve for switching the flow path from the fuel conversion device to the expansion device and/or the exhaust outlet. The switch valve may be located, shaped, and/or operated such that it enables to advantageously branch off and/or completely guide the exhausts such that they are led through the bypass duct. Thereby, the switch valve helps in further improving operation and flexibility of the energy conversion arrangement.

According to an aspect of an energy conversion arrangement, the switch valve allows for gradual switching of the flow path. Thereby, an amount of exhausts passing through the bypass duct and/or the expansion device can be regulated and/or adjusted as required. This helps in further improving operation and flexibility of the energy conversion arrangement.

According to an aspect of an energy conversion arrangement, the switch valve allows for a steplessly variable switching of the flow path. Thereby, an amount of exhausts passing through the bypass duct and/or the expansion device can be finely regulated and/or adjusted according to respective requirements. This helps in further improving controllability and flexibility of the energy conversion arrangement.

According to an aspect of an energy conversion arrangement, the bypass duct ends in the vicinity of the exhaust outlet. Thereby, the flow path of the exhausts leading through the expansion device and a flow path of the exhausts leading through the bypass duct may be joined near the exhaust outlet. This may help in mixing the exhausts from the expansion device and the bypass duct in an advantageous manner for reducing contrail production, for example, by means of a respective mixing assembly which may comprise a flow path of the exhausts exiting the expansion device and/or a flow path of the exhausts defined by the bypass duct, and/or respective outlets thereof.

According to an aspect of an energy conversion arrangement, the bypass duct ends within the exhaust outlet. Thereby, the bypass duct or termination or outlet opening thereof may form a part of the exhaust outlet and/or may be integrated therein. This may further help in mixing the exhausts coming from the expansion device and the bypass duct in an advantageous manner for reducing contrail production, for example, by means of a respective mixing assembly.

According to an aspect of an energy conversion arrangement, at the exhaust outlet, the flow path leading through the expansion device and the flow path leading through the bypass duct are joined. The exhaust outlet may comprise both, an outlet of the flow path leading through the expansion device, and an outlet of the flow path leading through the bypass duct. This may further help in mixing the exhausts from the expansion device and the bypass duct in an advantageous manner for reducing contrail production, for example, by means of a respective mixing assembly.

According to an aspect of an energy conversion arrangement, the flow path leading through the expansion device and the flow path leading through the bypass duct are at least partially extending and/or terminating in parallel and/or coaxially with respect to each other. On the one hand, this may help in arranging the flow paths such that it allows for a heat exchange between the exhausts that are led through the expansion device and the exhausts that are led through the bypass duct. On the other hand, mixing the exhausts from the expansion device and the bypass duct in an advantageous manner may be enhanced for reducing contrail production, for example, by means of a respective mixing assembly.

According to an aspect of an energy conversion arrangement, the energy conversion arrangement further comprises at least one sensor for providing at least one measurement value representing a temperature value, pressure value and/or humidity value of the exhausts and/or the energy conversion arrangement. The measurement value may be obtained in or at the flow path of the exhausts before, after and/or within the expansion device. Furthermore, the measurement value may be obtained for representing the surroundings of the energy system and/or an aircraft comprising the energy system, such that the measurement value represents any condition of the atmosphere surrounding the aircraft. Thereby, the at least one measurement value may help in operating the energy conversion arrangement in a way that contrails are avoided or at least reduced.

According to an aspect of an energy conversion arrangement, the energy conversion arrangement further comprises a control unit configured to adjust the flow path through the bypass duct based on the at least one measurement value. In particular, bypassing a turbine may reduce the energetic efficiency of the energy system as no or at least less enthalpy can be regained from the exhaust flow. Hence, it may be beneficial to only activate the bypass when persistent contrails can form, such as during flight through an ISSR. Furthermore, the control unit may help to operate the expansion device in a desired and/or required manner. Thus, control unit helps in improving operation and flexibility of the energy conversion arrangement.

According to an aspect of an energy conversion arrangement, the control unit is configured to keep the at least one measurement value within a pre-defined value range, and/or above or below a predefined value limit. The switch valve may function as a two-way or three-way discharge valve. Preferably, the bypass duct may only be activated when there is a risk of persistent contrail formation. Such an active mode of the bypass duct may help to an overall impact of bypassing the expansion device on efficiency of the energy system. When activated, the system efficiency could be reduced as no enthalpy can be regained from a turbine. Consequently, the control unit helps in further improving operation and flexibility of the energy conversion arrangement.

According to an aspect of an energy conversion arrangement, the bypass duct connects to at least one mixing assembly which is arranged in a flow path of the exhausts before and/or after the exhaust outlet and is configured to mix the exhausts with further exhausts from the energy conversion arrangement. The bypass duct can be configured to bypass at least one contrail reduction device, heating device and/or heat exchange device arranged in a flow path of air fed to the fuel conversion device and/or in the flow path of the exhausts, respectively. This may help in further improving operation, flexibility, and efficiency of the energy conversion arrangement.

According to a further solution, an energy conversion arrangement for an aircraft may be provided, comprising a fuel conversion device, in particular a fuel cell system, for converting at least one fuel to electrical and/or mechanical energy; an expansion device arranged in a flow path of exhausts produced in the fuel conversion device and configured to decompress the exhausts; and a contrail reduction device configured to introduce droplets of water into the flow path of the exhausts before and/or within the expansion device.

Water droplets can be added before the expansion device (turbine or nozzle) of the air supply of the fuel conversion system, for example comprising a fuel cell system. These droplets can shift a condensation onset upstream in the flow path of the exhausts within the expansion device. In other words, adding the droplets before the expansion device may lead to an earlier condensation. The earlier condensation reduces the maximum supersaturation of the flow. This is due to the phase change and the associated latent heat release during condensation onto the spray droplets. Overall, a droplet spectrum in the exhausts exiting the expansion device can be shifted to fewer numbers and larger radii, which reduces the climate impact of subsequent contrails.

According to an aspect of an energy conversion arrangement, the contrail reduction device comprises a spray nozzle for injecting the water into the exhausts. The spray nozzle may be optimized for producing droplets of a desired size. Thereby, contrail reduction may be enhanced.

According to an aspect of an energy conversion arrangement, the energy conversion arrangement further comprises a pump for pressurizing the water before introducing the droplets of water into the exhausts. The water pressure may be optimized for the injection of water into the flow path of the exhausts. This helps in further enhancing contrail reduction.

According to an aspect of an energy conversion arrangement, the water is at least partly a reaction product from the fuel conversion device. The water from the fuel conversion device will have to be ejected from the aircraft anyway. Liquid water can be provided from the fuel cell system. Consequently, using water from the fuel conversion device helps in providing synergetic effects when implementing the contrail reduction device.

According to an aspect of an energy conversion arrangement, the energy conversion arrangement further comprises a water separator for separating the water from products of the fuel conversion device. In particular, after the fuel cell stack, water separators can provide liquid water which has to be ejected from the aircraft anyways. Hence, for example, a by-product (liquid water) of a fuel cell system can be used for contrail reduction. Hence, only a few additional components for the water injection, but no additional major system, has to be introduced for reducing contrails.

According to an aspect of an energy conversion arrangement, the expansion device is configured to generate electrical and/or mechanical energy by decompressing the exhausts. The electrical and/or mechanical energy generated by the expansion device may be used for operating the energy conversion arrangement, in particular the fuel conversion device. Consequently, an overall energetic efficiency of the energy conversion arrangement may be improved.

According to an aspect of an energy conversion arrangement, the expansion device comprises a turbine. By means of the turbine, electrical and/or mechanical energy may be generated by the decompression of the exhausts. Hence, the turbine helps in improving an overall energetic efficiency of the energy conversion arrangement.

According to an aspect of an energy conversion arrangement, the expansion device comprises at least one throttle section. The expansion device may comprise a throttle valve. By the throttle section and/or the throttle valve, a desired rate of decompression of the exhausts may be achieved, possibly without causing any turbulences in the flow of the exhausts or at least less turbulences as may be produced by a turbine. Consequently, the throttle section and/or throttle valve may help in providing decompression while maintaining essentially laminar fluid flows. Furthermore, the throttle section and/or throttle valve may be provided in the bypass duct which may be arranged such that a turbine section is being bypassed with at least a part of the exhausts. Thereby, the throttle section and/throttle valve may help in optimizing conditions for contrail reduction.

According to an aspect of an energy conversion arrangement, the expansion device comprises at least one turbine section. The expansion device may comprise multiple turbine sections. The at least one turbine section can be arranged such in the flow path of the exhausts that contrails may be reduced.

According to an aspect of an energy conversion arrangement, the contrail reduction device is configured to introduce the droplets between the at least one throttle section and the at least one turbine section. For example, the at least one injection point may be arranged after a throttle section and before a turbine section or vice versa. Other injection points along the flow path are possible, including injection points directly at the exhaust of the aircraft. The energy conversion arrangement may further comprise an exhaust outlet for letting out exhausts produced in the fuel conversion system by the conversion. Introducing the droplets between the at least one throttle section and the at least one turbine section may help in optimizing contrail reduction.

According to an aspect of an energy conversion arrangement, the contrail reduction device is configured to introduce the droplets at at least two different introduction points into the flow path of the exhausts. The at least two different introduction points may be used independently of each other for introducing the droplets. Hence, the at least two introduction points allow for optimizing water introduction and thus contrail reduction.

According to an aspect of an energy conversion arrangement, the at least two different introduction points are spaced radially and/or axially apart from each other along the flow path. Any radial and/or axial distribution of the introduction points along the flow path can be optimized. Thereby, contrail reduction may be further improved.

According to an aspect of an energy conversion arrangement, the contrail reduction device is configured to introduce the droplets into a mid-turbine section into the flow path of the exhausts. For example, the mid-turbine section may be arranged between two turbine sections or within a turbine section. Introducing the droplets into a mid-turbine section can help in using thermodynamically optimized conditions for the water introduction in order to further enhance contrail reduction.

According to another solution, an energy conversion arrangement for an aircraft may be provided, comprising a fuel conversion device, in particular a fuel cell system, for converting at least one fuel to electrical and/or mechanical energy, and a contrail reduction device arranged in a flow path of exhausts produced in the fuel conversion device and configured to introduce droplets of water into the flow path, such that smaller droplets in the exhausts are collected through droplet coagulation.

The contrail reduction device can be arranged in fluid connection with the exhaust flow and configured to introduce droplets of water into the exhaust flow. Thereby, droplets sprayed into the flow hinder nucleation due to their own growth through condensation and the related latent heat release. This reduces the supersaturation and hence the homogeneous nucleation. Should no homogeneous nucleation occur inside of the fuel conversion system, introducing large droplets can still be beneficial. The droplets then provide a phase boundary for condensation in the plume. This will reduce or at least suppress homogeneous nucleation in the plume, thus also helping to reduce contrail production and enhance natural dissipation of contrails.

According to an aspect of an energy conversion arrangement, the contrail reduction device further comprises a spray nozzle, a pump, and a piping, wherein the piping is in fluid connection with the pump and adapted to conduct water to the spray nozzle. The droplets, preferably large droplets, can be introduced by one or more spray nozzles which are fed through a pump. Consequently, only a few, lightweight and low-cost additional components are needed for implementing the contrail reduction device. A power consumption of these component is relatively small. This allows for an efficient contrail reduction.

According to an aspect of an energy conversion arrangement, the spray nozzle is configured to introduce droplets of water of a diameter of approximately at least 20 microns. In comparison, droplets already present in the exhausts as they leave the fuel conversion device, in particular the fuel cell, and/or any further installation following the fuel conversion device before the exhausts reach the contrail reduction device, may be expected to be relatively small, the majority of droplets having a diameter well below 1 μm (micron). Introducing droplets with the big a diameter of at least 20 μm can help in fostering droplet coagulation and thus contrail reduction.

According to an aspect of an energy conversion arrangement, the water introduced by the spray nozzle is at least partly a reaction product from the fuel conversion device. The liquid water can be provided from a fuel cell system. The water from the fuel cell system is a by-product of the fuel conversion which has to be ejected from the aircraft anyway. Hence, using the wastewater from the fuel conversion device for contrail reduction has synergetic effects in that the wastewater can be used in a beneficial way.

According to an aspect of an energy conversion arrangement, the water introduced by the spray nozzle is at least partly from an external reservoir. The external reservoir can provide the water for the contrail reduction during load stages of the fuel conversion device where the fuel conversion device itself does not produce sufficient wastewater. Hence, providing the external reservoir helps in enhancing readiness of the contrail reduction device.

According to an aspect of an energy conversion arrangement, wherein the water introduced by the spray nozzle is at least partly from a water separation device, preferably downstream of the contrail reduction device. In particular after the fuel cell stack, water separators can provide liquid water which has to be ejected from the aircraft anyways. Thus, the water separation device helps in enhancing synergetic effects of the contrail reduction device.

According to an aspect of an energy conversion arrangement, the energy conversion arrangement further comprises a compressing device, and an expansion device, wherein the compressing device and/or the expansion device are configured to increase the power output of the energy conversion arrangement. The expansion device may comprise a turbine. Thereby, energetic efficiency of the energy conversion arrangement can be further improved.

According to an aspect of an energy conversion arrangement, the spray nozzle is arranged in an air outlet downstream of the expansion device, preferably inside of the expansion device. In the expansion device, the water vapor saturation line can be crossed and with sufficiently high supersaturation, homogeneous nucleation of water droplets may occur. This may result in a relatively large number of tiny droplets which grow through condensation. The corresponding phase change and associated latent heat release may cause a return to thermodynamic equilibrium. Therefore, introducing droplets downstream and/or even inside of the expansion device may help in fostering the production of bigger size droplets after the expansion device which then help in reducing contrail production or at least facilitate dissipation of any contrails.

According to an aspect of an energy conversion arrangement, the spray nozzle comprises a plurality of nozzle elements. The plurality of nozzle elements may be arranged in a parallel and/or serial manner along the flow path of the exhausts to optimize the introduction of droplets. Thereby, collecting smaller droplets in the exhausts through droplet coagulation may be enhanced.

According to an aspect of an energy conversion arrangement, the energy conversion arrangement further comprises an air inlet, wherein the air inlet is in fluid connection with ambient air and/or cabin air of the aircraft. Ambient air and/or cabin air can be fed to the energy conversion arrangement, in particular the fuel conversion device. As ambient air can be rather dry and cold, whereas cabin air can rather be warm and dry in comparison to the ambient air, there utilization for fuel conversion can help in optimizing conversion temperatures in the fuel conversion device and thereby contribute to the reduction of contrails.

According to an aspect of an energy conversion arrangement, the energy conversion arrangement further comprises means to increase droplet coagulation, preferably a vortex generator. Within a vortex of the exhausts generated by the vortex generator, local pressure variations and/or alternations of laminar and/or turbulent flows of the exhausts may help in fostering droplet coagulation. Thus, the vortex generator can further reduce contrails.

According to an aspect of an energy conversion arrangement, the energy conversion arrangement further comprises sensors to measure ambient conditions and/or a sensor to measure condensation and droplet sizes. Ambient conditions, condensation and/or droplet sizes can significantly influence contrail formation. Hence, measuring ambient conditions, condensation and/or droplet sizes by respective sensors can help in optimizing operation of the energy conversion arrangement, in particular the contrail reduction device, and thus contribute to effective contrail reduction.

According to an aspect of an energy conversion arrangement, the energy conversion arrangement further comprises heating and/or cooling devices to adapt a temperature of the water in order to increase the droplet size. Increasing the droplet size can help in fostering coagulation. Thus, operation of the energy conversion arrangement, in particular the contrail reduction device, can be further optimized for effective contrail reduction.

According to an aspect of an energy conversion arrangement, the energy conversion arrangement further comprises at least one of a humidifier, a dehumidifier and a heat exchanger. The humidifier, dehumidifier and/or heat exchanger may help in further influence droplet coagulation. Hence, the humidifier, dehumidifier and/or heat exchanger can help in optimizing operation of the energy conversion arrangement, in particular the contrail reduction device, and thus contribute to effective contrail reduction.

According to an additional solution, an energy conversion arrangement for an aircraft may be provided, comprising a fuel conversion device, in particular a fuel cell system, for converting at least one fuel to electrical and/or mechanical energy, and an exhaust outlet for letting out exhausts produced in the fuel conversion device by the fuel conversion; wherein at least one heating device is arranged in a flow path of the exhausts before the exhaust outlet and is configured to heat up the exhausts.

The heating device provides a heat source between the fuel conversion device and the exhaust outlet of the aircraft. The heating reduces the saturation, i.e., relative humidity, of the exhaust gas flow. A lower saturation reduces or altogether prevents droplet formation and condensation in the exhaust system. Droplet formation might still occur in the plume of the propulsion system. However, a likelihood of the formation of a large number of small droplets is reduced. This decreases the risk of contrail formation. Compared to the prior art, the solution is lighter, has lower costs and uses less space and power.

According to an aspect of an energy conversion arrangement, the energy conversion arrangement may further comprise an expansion device arranged in the flow path of the exhausts and configured to generate electrical and/or mechanical energy by expanding the exhausts. The electrical and/or mechanical energy generated by the expansion device may be used for operating the energy conversion arrangement, in particular the fuel conversion device. Consequently, an overall energetic efficiency of the energy conversion arrangement may be improved.

According to an aspect of an energy conversion arrangement, the expansion device comprises at least one turbine. By means of the at least one turbine, electrical and/or mechanical energy may be generated by the decompression of the exhausts. Hence, the at least one turbine helps in improving an overall energetic efficiency of the energy conversion arrangement.

According to an aspect of an energy conversion arrangement, the expansion device is arranged in the flow path of the exhausts after the heating device. The expansion device may be arranged between the heating device and the air outlet, i.e., before the air outlet. The heating device may thereby raise a temperature of the exhausts and may thereby increase a power output of the expansion device if used for generating electrical and/or mechanical energy. Thereby, the heating device helps in improving an overall energetic efficiency of the energy conversion arrangement.

According to an aspect of an energy conversion arrangement, the heating device comprises a catalytic converter for converting fuel residuals which have been left unconverted by the fuel conversion device to heat. The catalytic converter maybe configured to convert at least one fuel to heat. The catalytic converter, e.g., provided as a catalytic burner, can process leftover hydrogen from a fuel cell reaction. The hydrogen reacts with oxygen to create water while releasing heat. Thereby, the catalytic burner may help in enhancing contrail reduction by means of the heating device. Furthermore, the catalytic converter can prevent fuel emissions from the energy conversion arrangement.

According to an aspect of an energy conversion arrangement, the catalytic converter is configured to convert an additional fuel to heat. Also, additional hydrogen might be added to the flow upstream of the catalytic converter. Thereby, the effect of the catalytic converter for providing heat to be added to the exhausts through the heating device can be optimized for further enhanced contrail reduction.

According to an aspect of an energy conversion arrangement, the energy conversion arrangement further comprises a residual sensor element configured to measure at least one residual parameter value corresponding to an amount of the fuel residuals. In other words, the residual sensor element may measure an amount of fuel residuals, e.g., hydrogen residuals, in the exhausts. The amount of fuel residuals can be expressed by means of the residual parameter value. The residual parameter value can be used for optimizing operation of the energy conversion arrangement in order to further reduce contrail production.

According to an aspect of an energy conversion arrangement, the energy conversion arrangement further comprises an auxiliary fuel inlet arranged in the flow path of the exhausts before the catalytic converter for adding at least one fuel to the exhausts. By adding at least one fuel and/or additional fuel, the heat output of the catalytic converter can be adapted to respective requirements. Thus, the effect of the catalytic converter for providing heat to be added to the exhausts through the heating device can be optimized for further enhanced contrail reduction.

According to an aspect of an energy conversion arrangement, the heating device comprises at least one combustion unit configured to burn at least one fuel for heating up the exhausts. The combustion can be supplied with hydrogen from the same source as for the fuel cell. The combustion unit can provide additional heat to be introduced by the heating device. Thereby, the combustion unit can help in assuring a desired degree of contrail reduction.

According to an aspect of an energy conversion arrangement, the heating device comprises at least one heat exchange unit configured to heat up the exhausts. The heat exchanger can transfer heat from hotter flows in the fuel cell system. The heat exchange unit may provide any kind of waste and/or surplus heat to be used by the heating device. Thereby, the heat exchange unit can provide an efficient way for contrail reduction.

According to an aspect of an energy conversion arrangement, the energy conversion arrangement further comprises a compressing device for supplying the fuel conversion device with compressed supply air to be used for the fuel conversion; wherein the at least one heat exchange unit is configured to extract heat from the compressing device and/or the compressed supply air to be used for the conversion. Compressed supply air may be cooled by means of the heat exchange unit. Thereby, the heating device may help in further improving an overall energetic efficiency of the energy conversion arrangement, while at the same time contributing to contrail reduction.

According to an aspect of an energy conversion arrangement, the at least one heat exchange unit is configured to extract heat from the fuel conversion device and/or any auxiliary energy conversion unit. The heat exchange unit may be configured to cool down at least parts of the heat exchange unit and/or any auxiliary energy conversion unit. For example, auxiliary energy conversion units may be electrical and/or mechanical energy converters. Thereby, the heating device may help in further improving an overall energetic efficiency of the energy conversion arrangement, while at the same time contributing to contrail reduction.

According to an aspect of an energy conversion arrangement, the at least one heating device comprises an electrically powered heating element. The electric power for the electric heating can be supplied from the energy conversion arrangement. For example, the electric power may be provided through any energy recuperation means. Heating the exhausts by means of electric power may help in assuring a desired degree of contrail reduction.

According to another additional solution, an energy conversion arrangement for an aircraft may be provided, comprising a fuel conversion device, in particular a fuel cell system, for converting at least one fuel to electrical and/or mechanical energy, and an exhaust outlet for letting out exhausts produced in the fuel conversion device by the fuel conversion; wherein at least one mixing assembly is arranged in a flow path of the exhausts before and/or after the exhaust outlet and is configured to mix the exhausts with further exhausts from the energy conversion arrangement.

Waste heat of a fuel cell aircraft system can be used in the mixing assembly to avoid a high supersaturation in the plume of the discharged humid exhaust flow of fuel conversion device, e.g., a fuel cell system. This can be achieved by mixing the humid exhaust flow of the air supply system with a warm and dry gas flow before it can mix with the cold ambient air. Thereby, a maximum supersaturation in the plume and hence the number of droplets formed therein by be reduced. A decreased number of droplets reduces an amount of possible ice crystal formation and hence reduces contrail impact. In principle, a corresponding solution may utilize any heat source for providing the further exhausts.

According to an aspect of an energy conversion arrangement, the energy conversion arrangement further comprises a thermal management system configured to produce the further exhausts. A further exhaust flow provided by the thermal management system can be advantageous as it offers large amounts of waste heat and is usually located in close vicinity to the humid exhaust flow of the fuel conversion device. Consequently, the thermal management system may contribute to enhancing and overall energetic efficiency of the energy conversion arrangement, while at the same time reducing contrail production.

According to an aspect of an energy conversion arrangement, the thermal management system is configured as a heat exchanger. Thereby, the thermal management system may draw waste and/or surplus heat from any component of the aircraft in order to provide the further exhausts. This helps in further improving an overall energetic efficiency of the aircraft while at the same time contributing to contrail reduction.

According to an aspect of an energy conversion arrangement, the thermal management system comprises at least one heat exchanger element configured to extract heat from the fuel conversion device and/or any auxiliary energy conversion unit. The heat exchanger element can help in cooling the fuel conversion device and/or any auxiliary energy conversion unit down to a desired respective operating temperature. This additionally helps in further improving an overall energetic efficiency of the aircraft while at the same time contributing to contrail reduction.

According to an aspect of an energy conversion arrangement, the thermal management system is configured to take in cooling air, heat up the cooling air, and discharge the heated-up cooling air as the further exhausts. Otherwise, the cooling air would probably have to be ejected from the aircraft anyway. Consequently, using the cooling air for at least partly providing the further exhausts provides synergetic effects when applying the further exhausts for contrail reduction.

According to an aspect of an energy conversion arrangement, the thermal management system is configured to take in the cooling air from ambient surroundings. If taken up from ambient surroundings, in particular at cruising altitudes of aircraft, the cooling air may be particularly cold and dry. Hence, heating up the cooling air by means of the thermal management system even further adds to the relative dryness of the cooling air. Thus, mixing the relatively dry cooling air with the exhausts can help in reducing humidity of the overall exhausts of the aircraft, which may be beneficial for reducing contrails.

According to an aspect of an energy conversion arrangement, the thermal management system is configured to provide the fuel conversion device with a coolant at a coolant inlet temperature, and to receive back from the fuel conversion device the coolant at a coolant outlet temperature, wherein the coolant inlet temperature is lower than the coolant outlet temperature at least when the fuel conversion device operates at an operating temperature. The coolant thus helps in regulating the temperature of the fuel conversion device. Consequently, the coolant may contribute to enhancing and overall energetic efficiency of the energy conversion arrangement, while at the same time reducing contrail production.

According to an aspect of an energy conversion arrangement, the energy conversion arrangement further comprises an air supply system for supplying the fuel conversion device with supply air for the fuel conversion arranged upstream of the exhaust outlet. Consequently, the exhausts may at least partly flow through the air supply system. Consequently, the air supply system may be used to heat up the exhausts. This may help in reducing contrail production in that a relative humidity of the exhausts is being reduced.

According to an aspect of an energy conversion arrangement, the air supply system comprises a compressing device for supplying the fuel conversion device with compressed inlet air to be used for the fuel conversion; and at least one heat exchange unit configured to extract heat from the compressing device and/or the compressed air to be used for the conversion. The compressing device and/or compressed air may be cooled by means of the heat exchange unit. Thus, the heat exchange may help to improve overall energetic efficiency of the energy conversion arrangement, while at the same time contributing to contrail reduction.

According to an aspect of an energy conversion arrangement, the at least one heat exchange unit configured to heat up the exhausts. Heating up the exhausts may help in reducing a relative humidity of the exhausts. The reduced relative humidity may decrease the amount of contrails produced and may facilitate dissipation of any remaining contrails.

According to an aspect of an energy conversion arrangement, the energy conversion arrangement further comprises an expansion device for decompressing the exhausts arranged in the flow path of the exhausts upstream of the mixing assembly. The expansion device may be configured to generate electrical and/or mechanical energy by expanding the exhausts. The expansion device may comprise at least one turbine. The expansion device may be part of the air supply system. Consequently, the expansion device may help to improve overall energetic efficiency of the energy conversion arrangement.

According to an aspect of an energy conversion arrangement, the further exhausts provide a gas flow that is relatively drier than the exhausts. Thus, mixing the further exhausts with the exhausts can help in reducing humidity of the overall exhausts of the aircraft, which may be beneficial for reducing contrails. The mixing operation may be applied whenever necessary in order to achieve a desired amount of contrail reduction. Consequently, the mixing operation helps in providing a versatile store of measures for contrail reduction.

According to an aspect of an energy conversion arrangement, the mixing assembly comprises a further exhaust outlet opening configured to let out the further exhausts to ambient surroundings; wherein the exhaust outlet has an exhaust outlet opening configured to let out the exhausts to the ambient surroundings; and wherein the further exhaust outlet is arranged before the exhaust outlet with respect to an intended direction of movement of the aircraft during standard operation of the aircraft along a discharge line extending essentially in parallel to the direction of movement. The further exhaust outlet opening can be arranged before the exhaust outlet opening such that warm and dry further exhaust air is mixed with humid air exhausts from the fuel conversion device during operation of the aircraft. Mixing the further exhausts with the exhausts in such a way may help in additionally reducing a relative humidity of the overall exhausts of the aircraft. The reduced relative humidity may decrease the amount of contrails produced and may facilitate dissipation of any remaining contrails.

BRIEF DESCRIPTION OF THE DRAWINGS

The subject matter will hereinafter be described in conjunction with the following drawing figures, wherein like numerals denote like elements, and wherein.

DETAILED DESCRIPTION OF THE PREFERRED EMBODIMENTS

Figure 1:
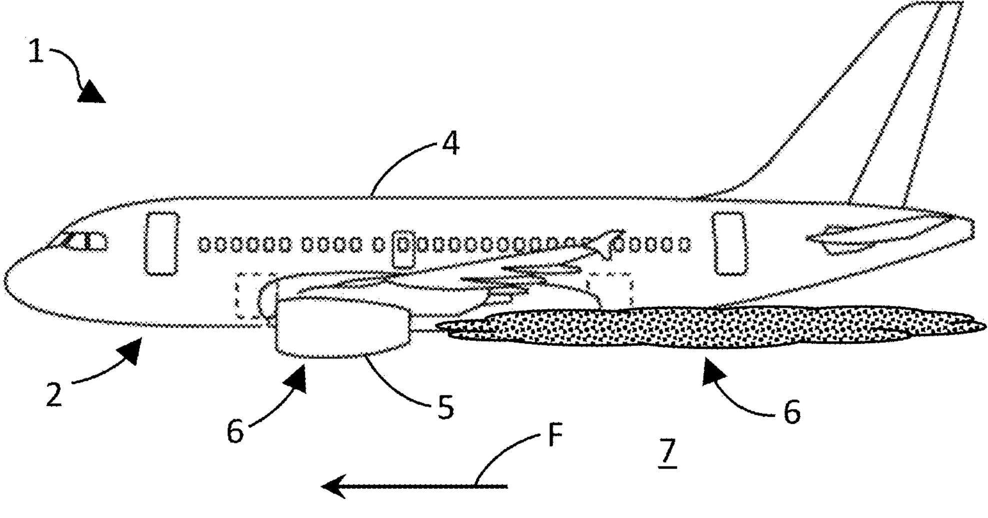
FIG. 1 is a schematic side view of an aircraft comprising an energy system with an energy conversion arrangement producing a plume of exhausts during flight.

The following detailed description is merely exemplary in nature and is not intended to limit the invention and uses of the invention. Furthermore, there is no intention to be bound by any theory presented in the preceding background or the following detailed description. The representations and illustrations in the drawings are schematic and not to scale. Like numerals denote like elements. A greater understanding of the described subject matter may be obtained through a review of the illustrations together with a review of the detailed description that follows.

FIG. 1 shows a schematic side view of an aircraft 1 comprising an energy system 2 and a fuselage 3 with and surrounded by a hull 4. For example, the energy system 2 comprises a propulsion unit 5 emitting a plume 6 of humid exhaust air into the atmosphere 7 behind the aircraft 1 while the aircraft 1 travels through the atmosphere 7 along a travel direction F. The humid exhaust air from the air supply system is emitted from the aircraft and mixes with the ambient cold air. The humid exhaust air can be itself unsaturated, oversaturated or saturated with droplets present. Typical values for temperature and relative humidity of the emitted humid air range from 30° C. to 80° C. and 60% to 300%, respectively. Furthermore, the hull 4 may surround any interior space of the aircraft including a cabin for transporting passengers and goods as well as comprising any components of the energy system 2.

Figure 2:
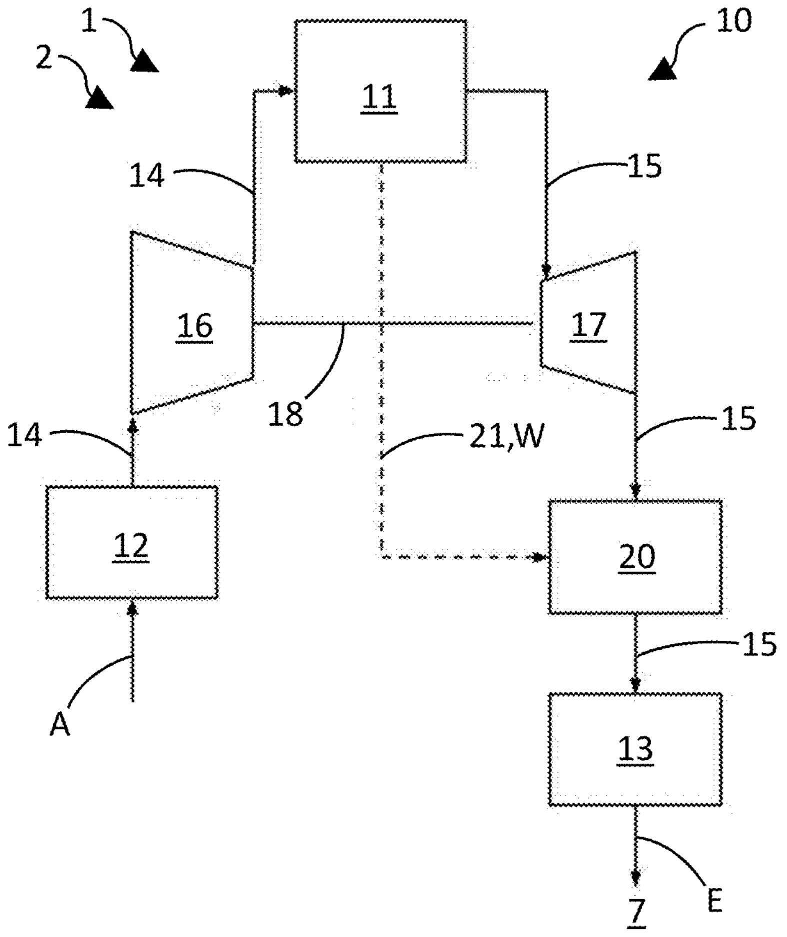
FIG. 2 is a schematic illustration of an energy conversion arrangement comprising a contrail reduction device.

FIG. 2 shows a schematic illustration of an energy conversion arrangement 10 of the energy system 2 of the aircraft 1. The energy conversion arrangement 10 comprises a fuel conversion device 11, for example, provided as a fuel cell system for converting hydrogen to electricity and predominantly water vapor as exhausts E of the fuel conversion. Air A, for example taken from ambient surroundings, such as the atmosphere 7, and/or from inside the hull 4, e.g., from a cabin of the aircraft 1, is provided to the fuel conversion device 11 through an air inlet 12 of the energy conversion arrangement 10. The exhausts E are released to the atmosphere 7 through an exhaust outlet 13 of the energy conversion arrangement 10.

The air A is guided along a respective flow path 14 from the air inlet 12 to the fuel conversion device 11. The exhausts E are guided along a respective flow path 15 from the fuel conversion device 11 to the exhaust outlet 13. A compression device 16 of the energy conversion arrangement 10 is provided in the flow path 14 between the air inlet 12 and the fuel conversion device 11 for compressing the inlet air A. An expansion device 17 is provided in the flow path 15 between the fuel conversion device 11 and the exhaust outlet 13 for decompressing the exhausts E. The compression device 16 is connected to the expansion device 17 via a transmission line 18 which may comprise any kind of mechanical and/or electrical energy transmission means and for example, may be embodied as a shaft or the like. The compression device 16 may comprise a turbine 19 (see FIG. 6).

Furthermore, the energy conversion arrangement comprises a contrail reduction device 20. A water supply line 21 is provided to connect the contrail reduction device 20 to the fuel conversion device 11. Thereby, the contrail reduction device 20 may be provided with water W produced in the fuel conversion device 11 by the fuel conversion.

The air inlet 12 provides ambient air A to the compressing device 16 which supplies the fuel conversion device 11 with air A at an elevated pressure. The humid exhausts E, e.g., exhaust air of the fuel cell system of the fuel conversion device 11 is expanded in the turbine to provide power to the compressor. During expansion in the expansion device 17, a water vapor saturation line may be crossed and with a sufficiently high supersaturation, homogeneous nucleation may occur. This results in a large number of tiny exhaust droplets DE which grow through condensation (see FIG. 3).

This phase change and the associated latent heat release cause a return to thermodynamic equilibrium. The resulting exhaust droplet DE diameters dE are expected to be small, with a majority well below 1 micron. If this large number of small exhaust droplets DE is being emitted from the aircraft 1, there is a high risk of formation of a dense contrail from the plume 6 which might have a strong negative climate impact. To reduce this risk, the contrail reduction device 20 is supplied with liquid water W, which can be a by-product of the fuel conversion.

Figure 3:
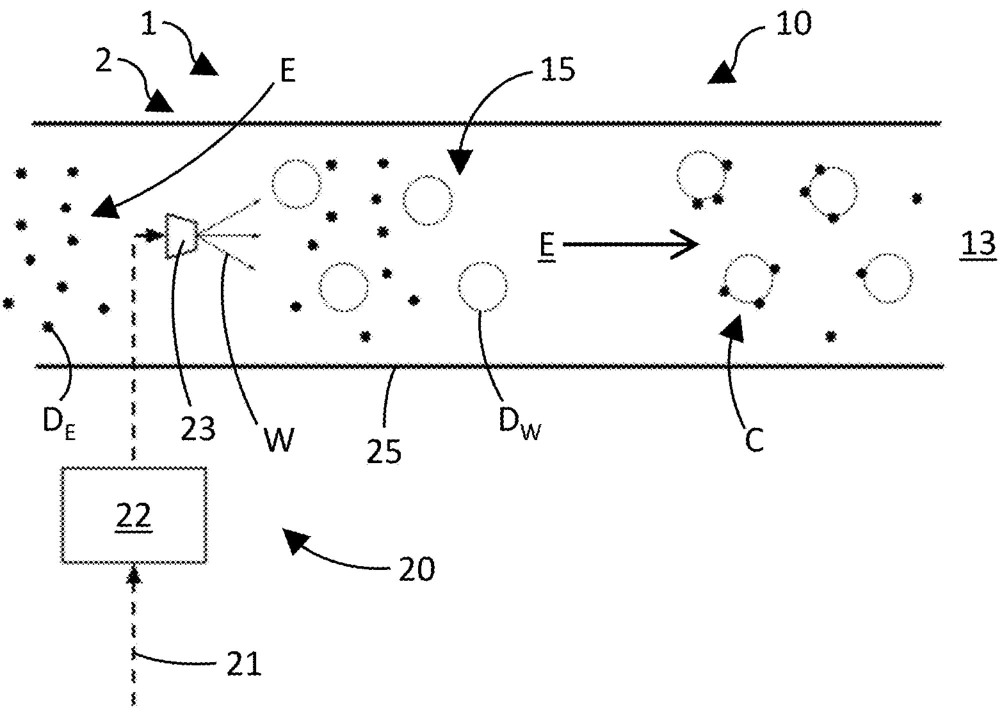
FIG. 3 is a schematic illustration of the contrail reduction device of the energy conversion arrangement shown in FIG. 2 in operation.

FIG. 3 shows a schematic illustration of the contrail reduction device 20 of the energy conversion arrangement 10 shown in FIG. 2 in operation. The contrail reduction device 20 comprises a pump 22 provided in the water supply line 21 to pressurize the water W and a spray nozzle 23 arranged in an air duct 25 to spray the water W into the exhausts E which may comprise droplets DE with the respective droplet diameter dDE of approximately below 1 μm by average before reaching the contrail reduction device 20. The liquid water W is provided to the spray nozzle 23 which creates water droplets DW with an average diameter dDW larger than 20 microns.

The smaller exhaust droplets DE coagulate on the larger water droplets DW and thus form coagulated droplets C. Effectively, the droplet number is reduced and the average diameter dAVG is increased. The coagulated droplets C lead to less harmful contrails as their combined surface is smaller than a sum of the surfaces of the exhaust droplets DE and the water droplets DW. Size and velocity of the water droplets DW sprayed from the spray nozzle 23 must be chosen in a way that the critical Weber Number of about 12 is not surpassed. Otherwise, the water droplets DW will break up into much smaller droplets, counteracting the desired effect.

Figure 4:
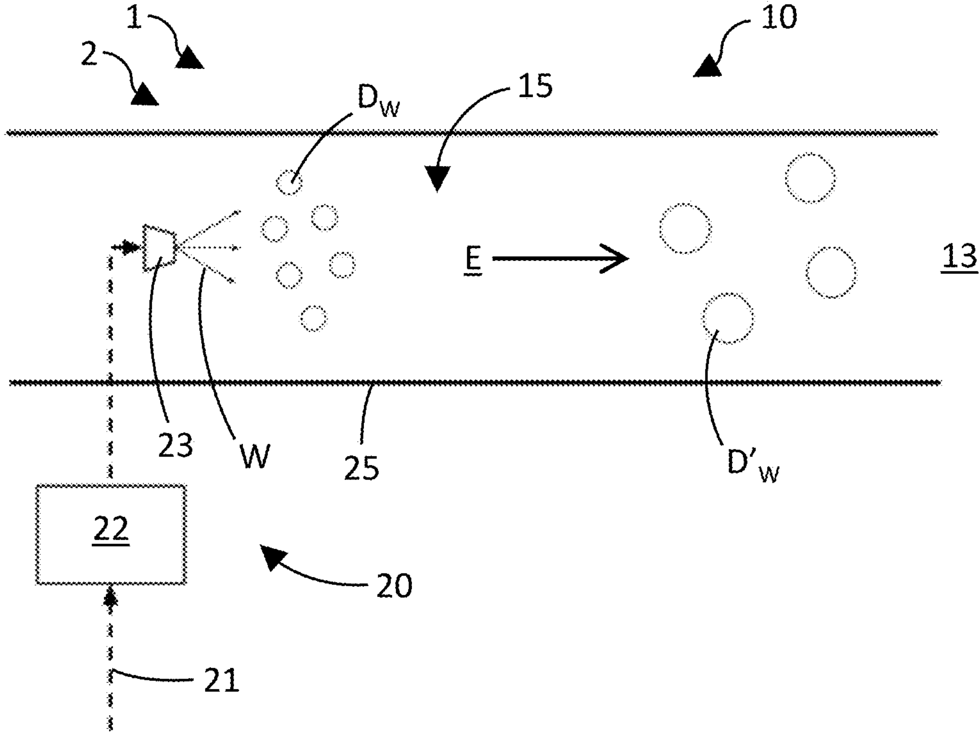
FIG. 4 is another schematic of the contrail reduction device of the energy conversion arrangement shown in FIG. 2 in operation.

FIG. 4 shows another schematic duration of the contrail reduction device 20 of the energy conversion arrangement shown in FIG. 2 in operation. Here, no exhaust droplets DE occur due to a lack of supersaturation of water vapor in the exhausts E. If the supersaturation before the contrail reduction device 20 is not sufficient for droplet formation, the contrail reduction device 20 can still reduce the risk for contrail formation. Without exhaust droplets DE, the water vapor in the plume 6 oversaturates during plume mixing outside of the aircraft 1. Again, a large number of droplets with small diameters will be formed through homogeneous nucleation. In this case, droplets generated in the contrail reduction device 20 either grow in a slightly oversaturated flow through condensation to form enlarged water droplets D'W or, in an unsaturated flow, are still large enough to persist when emitted from the aircraft 1. During plume mixing, these pre-existing droplets DW, D'W may provide phase boundaries for condensation which prevents high oversaturation and homogeneous nucleation. This leads to a small number of large droplets D'W instead of a large number of small droplets DW.

Figure 5:
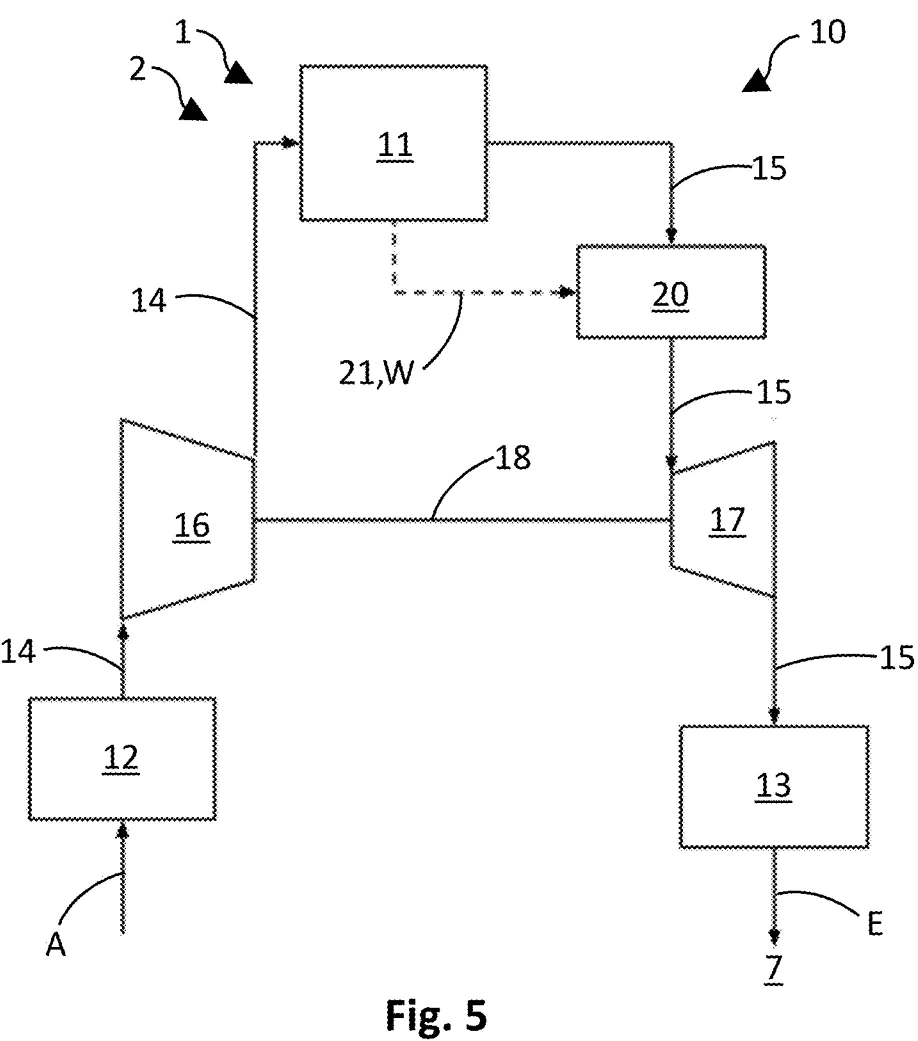
FIG. 5 is a schematic illustration of further embodiment of an energy conversion arrangement comprising a contrail reduction device.

FIG. 5 shows a schematic illustration of further embodiment of an energy conversion arrangement 10 comprising a contrail reduction device 20. Here, the contrail reduction device 20 is arranged in the flow path 15 between the fuel conversion device 11 and the expansion device 17 which comprises a turbine 19 (see FIG. 6). Liquid water W provided by fuel conversion device 11 is injected into the flow path 15 of the exhausts W upstream of the expansion device 17 using the spray nozzle 23 as illustrated in FIGS. 3 and 4. The water droplets DW begin to grow through condensation as soon as supersaturation is reached during expansion in the expansion device 17. Because of the phase change and the release of the latent heat, this limits the maximum supersaturation reached.

A lower maximum supersaturation corresponds to a smaller nucleation rate of water droplets DW. This number decrease is larger than the droplet number introduced by the spray nozzle 23. In total, the droplet spectrum is again shifted to fewer, larger droplets C, D'W. The freezing of less droplets leads to an optically "thinner" contrail, reducing its climate impact, as the combined droplet surface is smaller.

Figure 6:
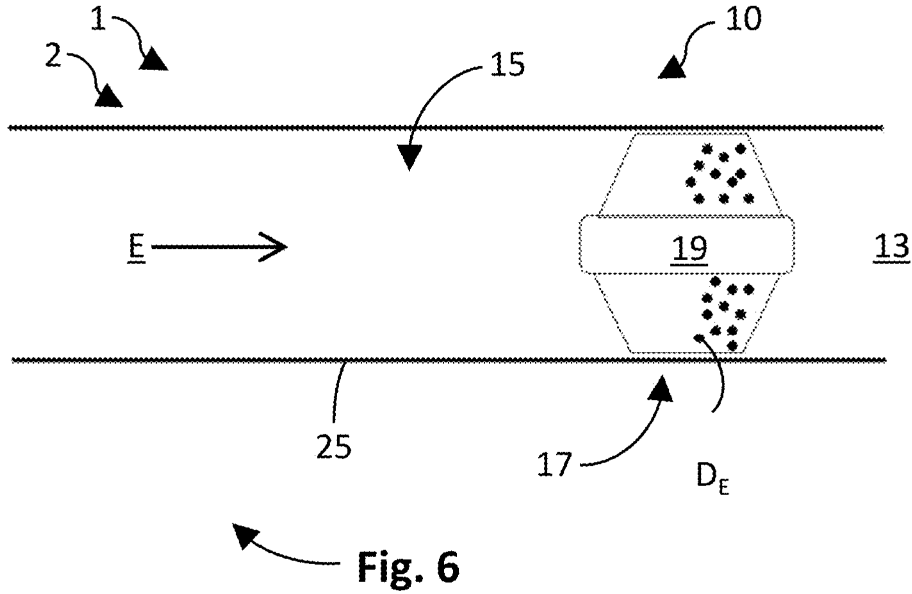
FIG. 6 is a schematic illustration of an expansion device of the energy conversion arrangement shown in FIGS. 1 to 5.

FIG. 6. shows a schematic illustration of the expansion device 17 of the energy conversion arrangement 10 shown in FIGS. 1 to 5 comprising the turbine 19. Without any contrail reduction measure, the water vapor in the plume 6 may oversaturate during plume mixing outside of the aircraft 1. Again, a large number of droplets with small diameters would be formed through homogeneous nucleation.

Figure 7:
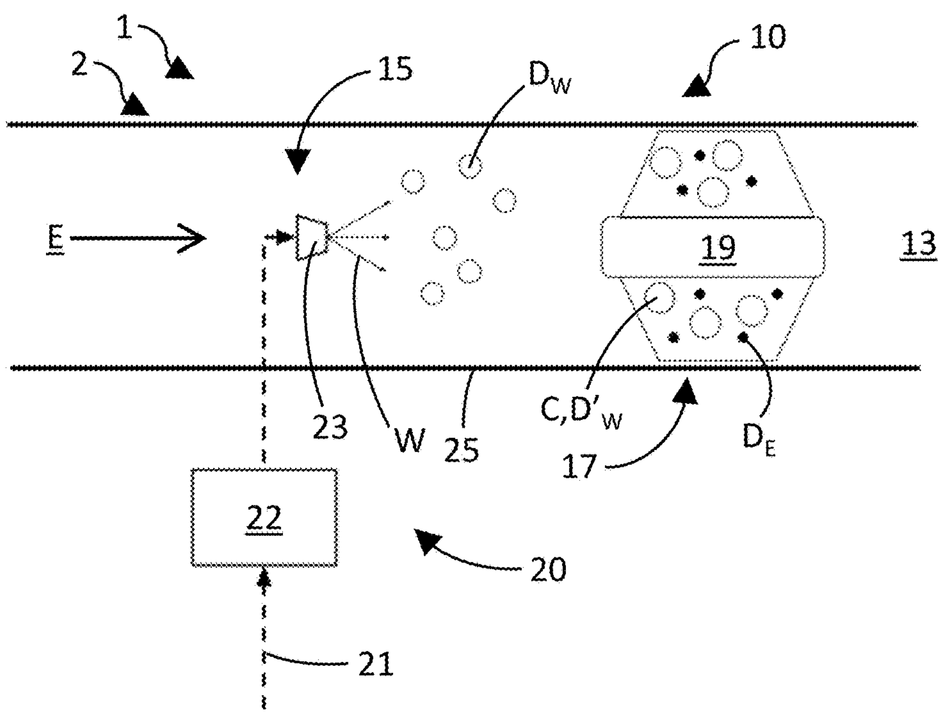
FIG. 7 is a schematic illustration of an expansion device of the energy conversion arrangement shown in FIGS. 1 to 6 with the contrail reduction device in operation.

FIG. 7 shows a schematic illustration of an expansion device 17 of the energy conversion arrangement shown in FIGS. 1 to 6 with the turbine 19 and the contrail reduction device 20 in the flow path 15 of the exhausts E upstream of the turbine 19 in operation. The injection of water droplets DW provides phase boundaries for condensation during expansion of the exhausts E within the turbine 19 which prevents high oversaturation and reduces or avoids homogeneous nucleation. This leads to a small number of large droplets C, D'W instead of a large number of small droplets DE. The injected water droplets DW should be as small as possible. The larger the injected combined droplet surface is, the stronger is the reduction of the maximum supersaturation and nucleation rate.

Injecting water droplets DW in front of the turbine 19 may pose a risk of droplet erosion, corrosion, and other damages because of liquid water W. However, respective mitigation measures are well known from steam turbine research.

Another option is to operate the contrail reduction device 20 in any of the embodiments described herein only when there is a risk of contrail formation. However, there might also be an efficiency improvement for the turbine 19 due to reduced phase change losses when operating the contrail reduction device 20. The fact that the injection of water droplets DW reduces the maximum nucleation rate is well known to science (see FIG. 8).

Figure 8:
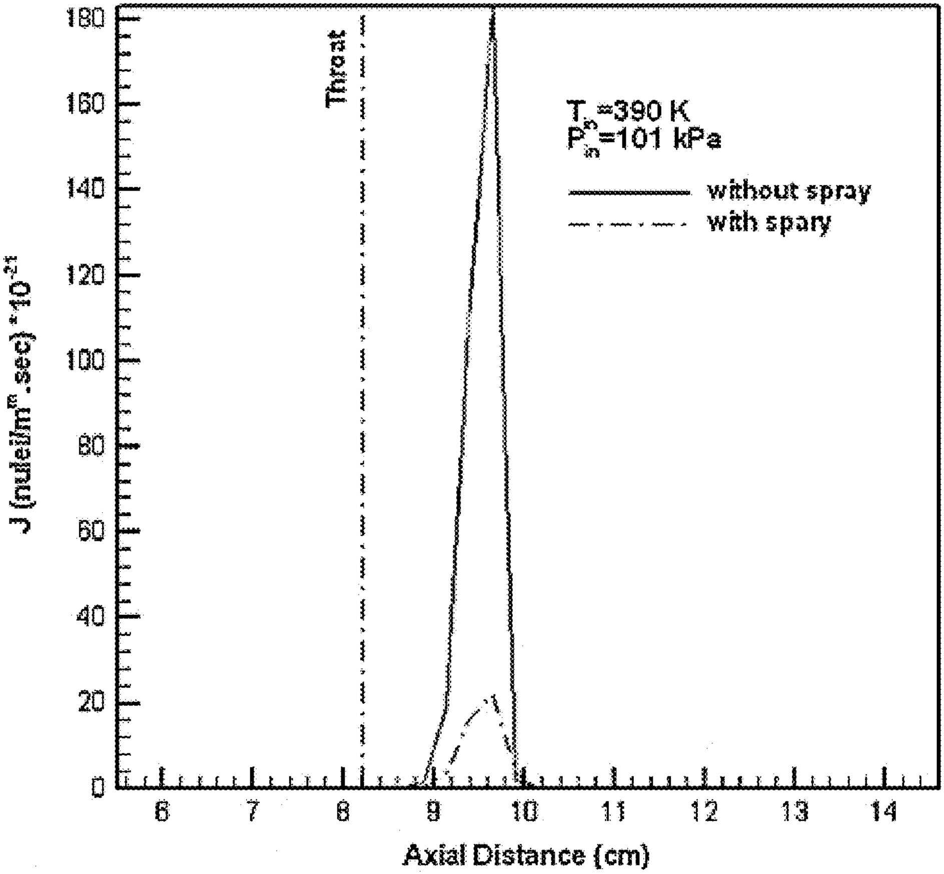
FIG. 8 is a schematic diagram showing an effect of water droplet injection on a maximum nucleation rate of water droplets within exhausts of the energy conversion arrangement.

FIG. 8 shows a schematic diagram showing an effect of water droplet DW injection on a maximum nucleation rate of water droplets DW within exhausts E of the energy conversion arrangement 10 (see Teymourtash et al., "The effects of rate of expansion and injection of water droplets on the entropy generation of nucleating steam flow in a Laval nozzle", Heat Mass Transfer (2009) 45:1185-1198, p. 1196, FIG. 20: Effect of injection droplets on the rate of nucleation, a=6°). Here it becomes apparent that the rate of nucleation decreases by the injection of water droplets DW into the exhausts E. This can be interpreted such that latent heat released to the vapor reduces through a limited phase transition from vaporized to liquid water. However, this is dominated by a following condensation of water. If a final pressure is the same, also the amount of liquid water formed should be the same. Nevertheless, this amount should be distributed amongst a reduced number of drops or droplets which can help in reducing contrail production. A divergent angle a of 6° is assumed for a Laval nozzle underlying the present example.

Figures 9, 10:
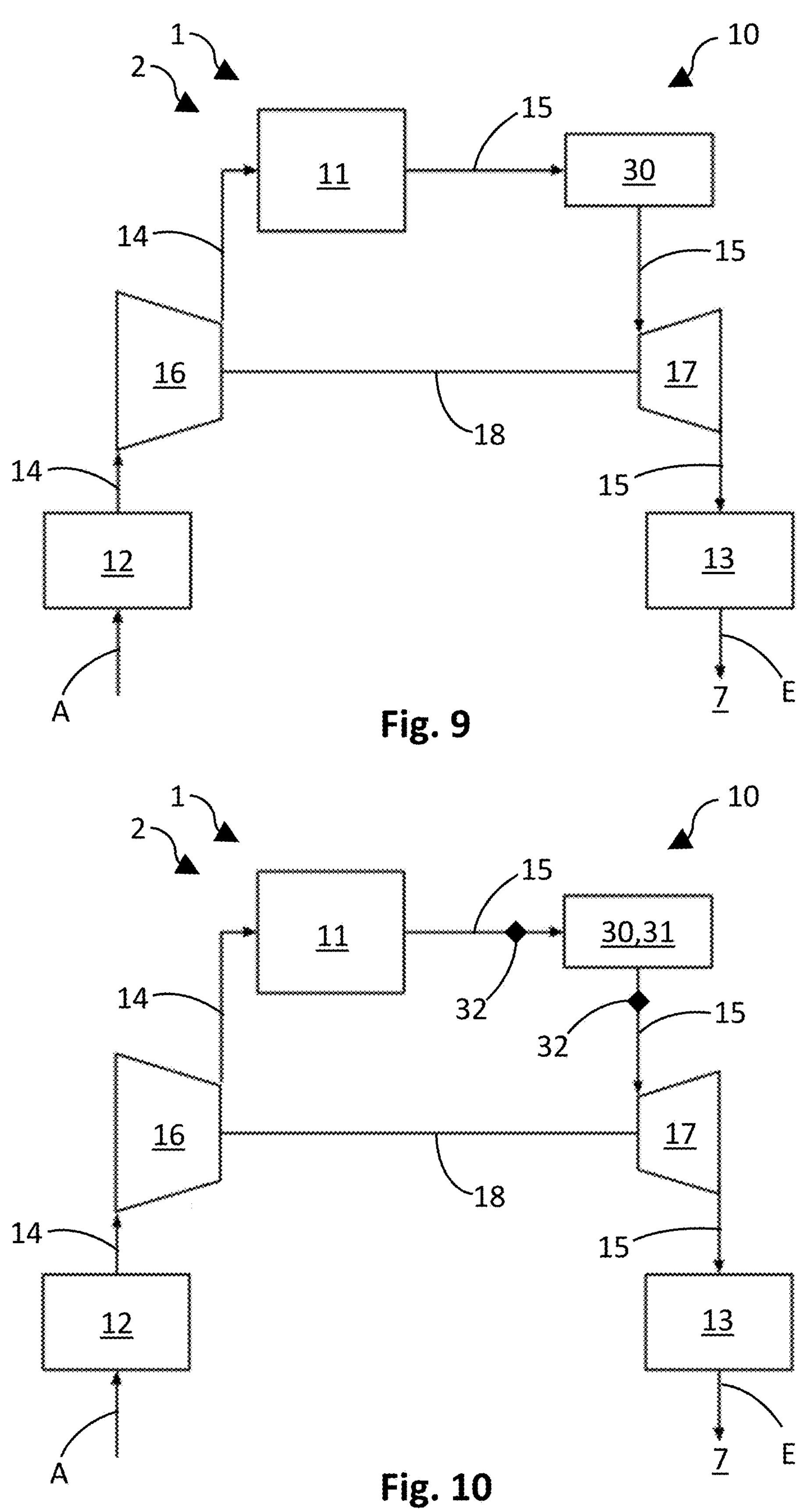
FIG. 9 is a schematic illustration of another embodiment of an energy conversion arrangement provided with a heating device.
FIG. 10 is a schematic illustration of the energy conversion arrangement shown in FIG. 9 where the heating device comprises a catalytic converter.

FIG. 9 shows a schematic illustration of another embodiment of an energy conversion arrangement 10 provided with a heating device 30. The heating device 30 is located in the flow path 15 between the fuel conversion device 11 and the exhaust outlet 13. In particular, the heating device 30 is located in the flow path 15 of the exhausts E upstream of the expansion device 17. The exhausts E, e.g., humid exhaust air from a fuel cell system of the fuel conversion device 11, is heated in the heating device 30. The heated exhausts E are being expanded in the expansion device 17, e.g., the turbine 19 thereof, to provide power to the compressing device 16 via the transmission line 18.

The saturation increases during expansion in the expansion device 17. However, the saturation level is overall smaller due to the heating provided by the heating device 30. Alternatively, or additionally, the heating device 30 can be placed in the flow path 15 downstream of the expansion device 17. This altogether prevents droplet formation or at least significantly reduces it. Fewer droplets pose a smaller risk to the formation of a dense contrail. A flow of exhausts E release to the atmosphere 7 with no or few droplets might still lead to droplet formation in the plume 6 outside of the aircraft 1. However, this is still expected to be beneficial as in this process the maximum achieved saturation level is assumed to be smaller than without heating. A smaller maximum saturation level corresponds with fewer, larger droplets C, D'W.

FIG. 10 shows a schematic illustration of the energy conversion arrangement 10 shown in FIG. 9 where the heating device 30 comprises a catalytic converter 31. The catalytic converter 31, for example provided as a catalytic burner, can process leftover fuel, e.g., hydrogen from a fuel cell reaction performed in the fuel conversion device 11. The fuel reacts with oxygen to create water while releasing heat. The added heat overcompensates the saturation increase due to the added water W. The catalytic burner also prevents fuel emissions from the energy conversion arrangement 10. Sensors 32 may be provided to measure a fuel concentration in the flow path 15 of the exhausts E before and/or after the catalytic burner 31. Additional fuel B can be added to the flow path 15 of the exhausts E upstream of the catalytic burner 31 (see FIG. 11).

Figures 11, 12:
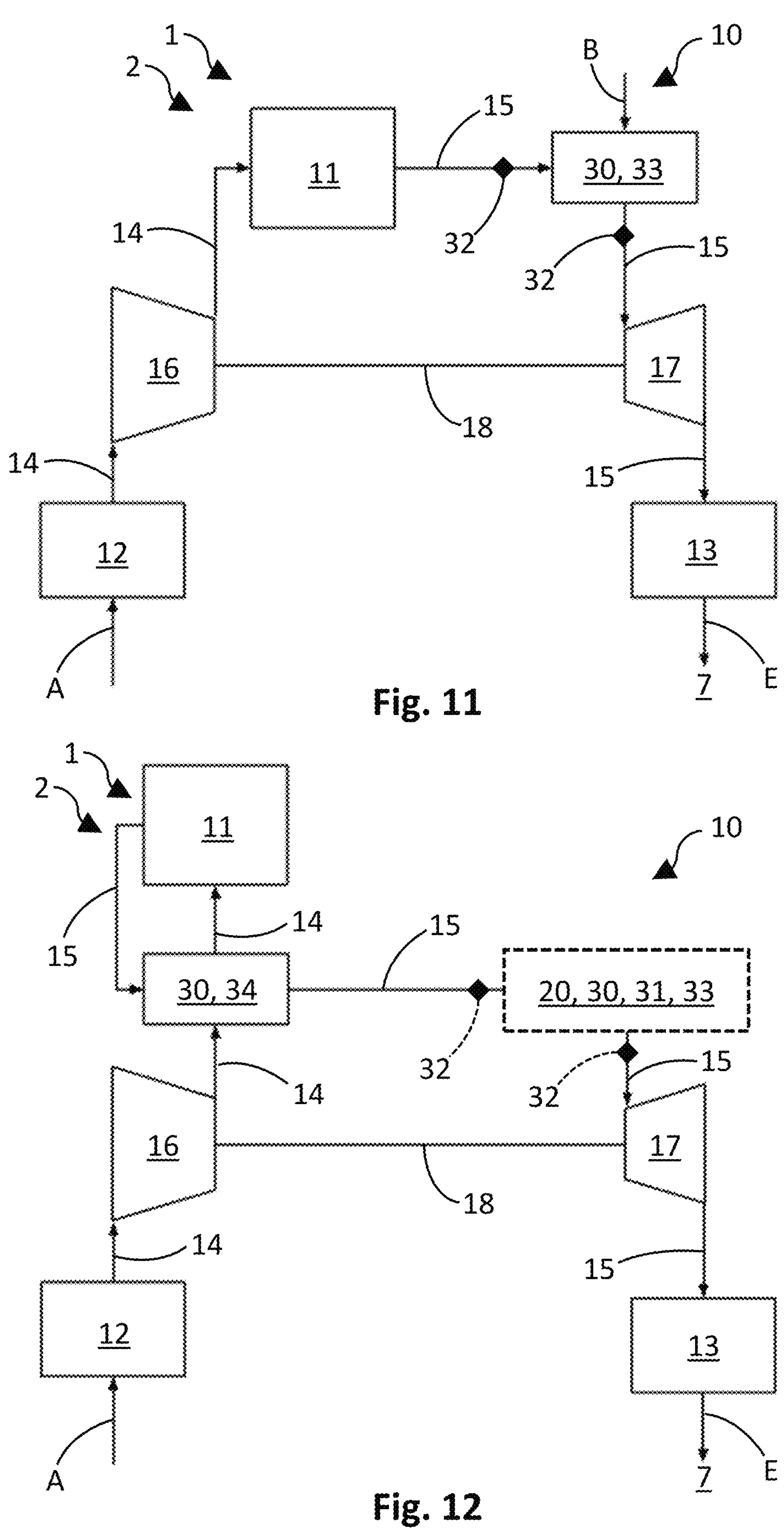
FIG. 11 is a schematic illustration of the energy conversion arrangement shown in FIGS. 9 and 10 where the heating device comprises a combustion chamber.
FIG. 12 is a schematic illustration of the energy conversion arrangement shown in FIGS. 9 to 11 where the heating device comprises a heat exchange device.

FIG. 11 shows a schematic illustration of the energy conversion arrangement shown in FIGS. 9 and 10 where the heating device 30 comprises a combustion chamber 33 and depicts a fuel cell system with a combustion chamber which burns hydrogen. In the combustion chamber 33, the additional fuel B reacts with oxygen, for example in that hydrogen added as additional fuel B reacts water W, while releasing heat. The added heat overcompensates the saturation increase due to the added water W. The combustion also prevents fuel emissions from the energy conversion arrangement 10.

FIG. 12 shows a schematic illustration of the energy conversion arrangement 10 shown in FIGS. 9 to 11 where the heating device 30 comprises a heat exchange device 34. The heat exchange device 34 adds heat to the exhausts E of the fuel conversion device 11 and thereby reduces the saturation before the expansion device 17. Alternatively, or additionally, the contrail reduction device 20, heating device 30, catalytic converter 31, sensors 32, and/or combustion chamber 33 may be provided in the flow path 15 of the exhausts E before, within, and/or after the expansion device 17. Heat not transferred from the outflow of the compressing device in the flow path 14 of the air A may be gained from other heat sources of the fuel conversion device 11, in particular from a thermal management system 40 which may comprise multiple heat exchange devices 30 and/or heat exchange elements (see FIG. 14).

Figure 13:
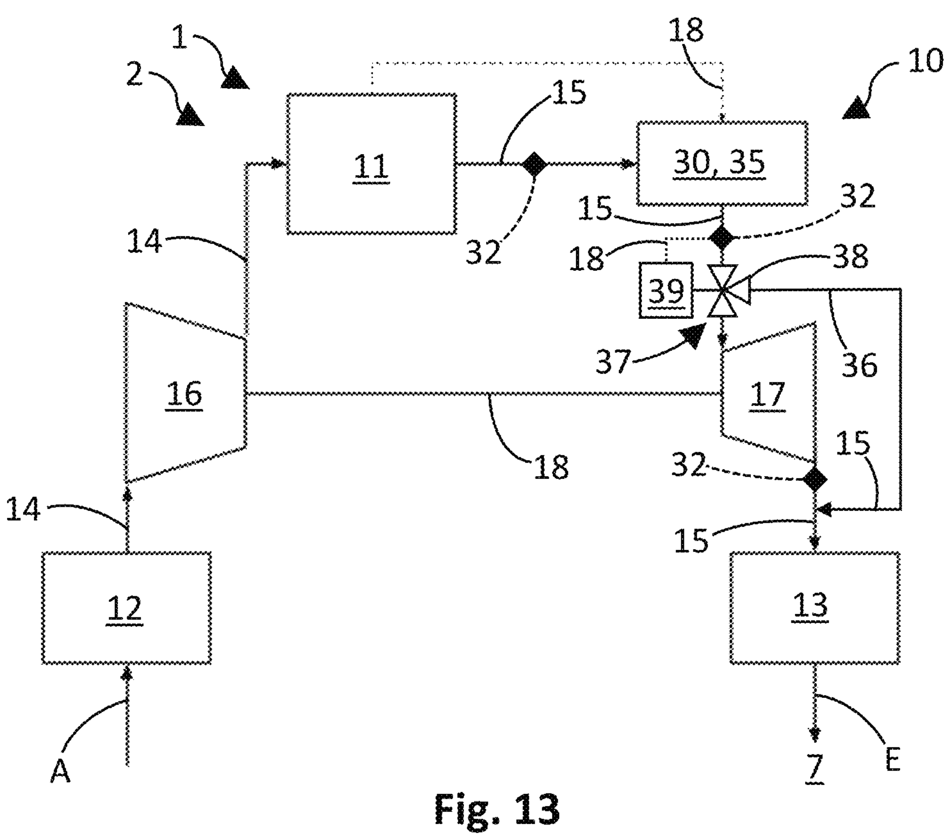
FIG. 13 is a schematic illustration of the energy conversion arrangement shown in FIGS. 9 to 12 where the heating device comprises an electric heating element and a bypass duct is provided.

FIG. 13 shows a schematic illustration of the energy conversion arrangement 10 shown in FIGS. 9 to 12 where the heating device 30 comprises an electric heating element 35. The heating element 35 may provide electric heating to reduce contrail formation. The added heat reduces the saturation before the expansion device 17. Electric power may be provided to the heating element 35 by means of the transmission line 18 from the fuel conversion device 11 and/or from other sources (not shown).

Furthermore, the energy conversion arrangement 10 may comprise a bypass duct 36 connecting to the flow path 15 of the exhausts E via a flow junction 37. The flow junction 37 may comprise a switch valve 38 which, for example, may be operated in a stepless manner, to let the exhausts E through to the expansion device 17 and/or lead the exhausts E to the exhaust outlet 13 via the bypass duct 36. The switch valve 38 may be operated with the help of a control unit 39 which may be connected to at least one of the sensors 32 via respective transmission line 18 for transmitting energy and/or information.

In operation of the energy conversion arrangement 10, the exhausts E may be branched off from the flow path 15 at the flow junction 37 to bypass the expansion device 17 through the bypass duct 36, thereby forming an alternate or auxiliary flow path 15 for the exhausts E in addition to the main flow path 15 of the exhausts E leading through the expansion device 17. The amount of exhausts E bypassing the expansion device 17 may be controlled by means of the control unit 39 in order to keep any measurement value, such as a temperature value, a pressure value, and/or a humidity value, measured by means of at least one of the sensors 32 before, within, and/or after the expansion device 17 within, above, and/or below a respective desired or required value range and/or limit.

Alternatively, or additionally, the flow junction 37 may be arranged within the expansion device 17, for example, between certain sections thereof. The flow path 15 leading through the expansion device 17 and the flow path 15 leading through the bypass duct 36 may be joined within and/or after the expansion device 17 and/or the exhaust outlet 13. The bypass duct 36 may be used to bypass any section or component of the energy conversion arrangement 10 as described herein. Therefore, at least one flow junction 37 may be arranged as desired or required for bypassing the expansion device 17, the contrail reduction device 20, the heating device 30, and/or the heat exchange device 34.

Figure 14:
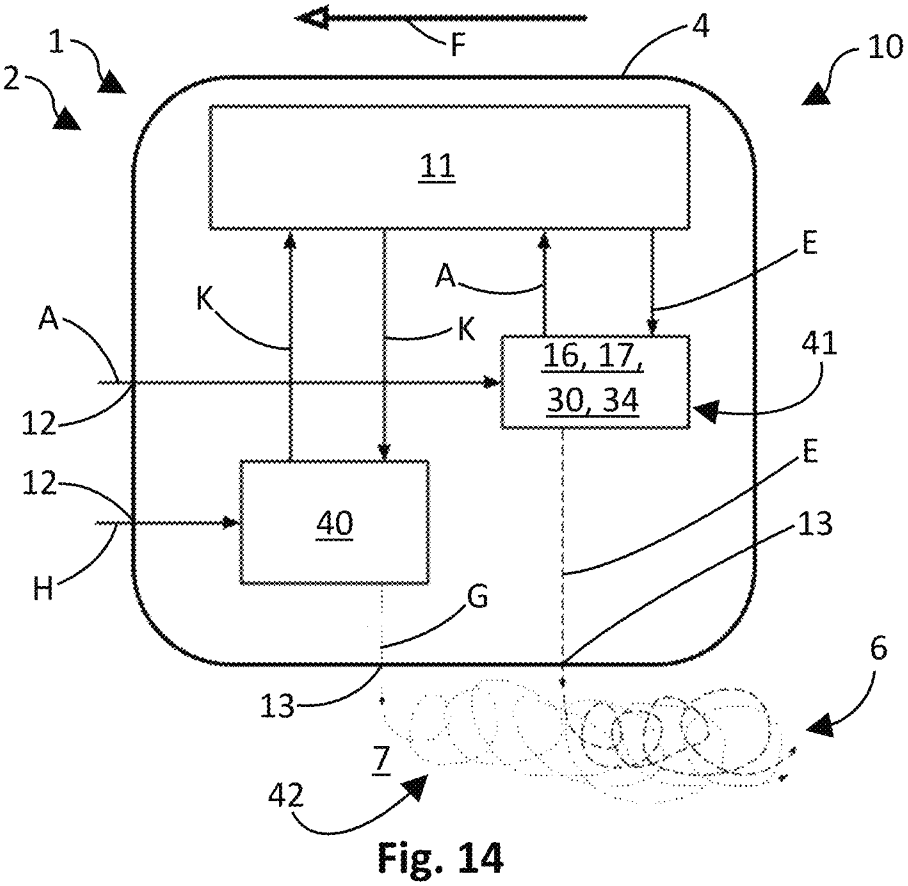
FIG. 14 is a schematic illustration of a thermal management system of any of the embodiments of an energy conversion arrangement shown herein.

FIG. 14 shows a schematic illustration of a thermal management system 40 of any of the embodiments of an energy conversion arrangement 10 shown herein. The thermal management system 40 may emit further exhausts G, such as air and/or gases which preferably have a higher temperature and/or less relative humidity than the exhausts E. The further exhausts G can be released from the aircraft 1 by being emitted beyond the hull 4 in travel direction F before the exhausts E in the travel direction F. The exhausts E can have passed through an air supply system 41 comprising the compressing device 16, expansion device 17, heating device 30, and/or heat exchange device 34. Respective exhaust outlets 13 for the exhausts E and the further exhausts G may provide a mixing assembly 42.

The thermal management system 40 can receive further air H from the atmosphere 7 and/or from inside the hull 4. The further air H may be used in the thermal management system 40 to cool down a coolant K which is then supplied to the fuel conversion device 11 in order to maintain a desired temperature level for efficient fuel conversion in the fuel conversion device 11. The coolant K may then be that back to the thermal management system 40. The further air H can be warmed up by means of the coolant K from the fuel conversion device 11.

Figure 15:
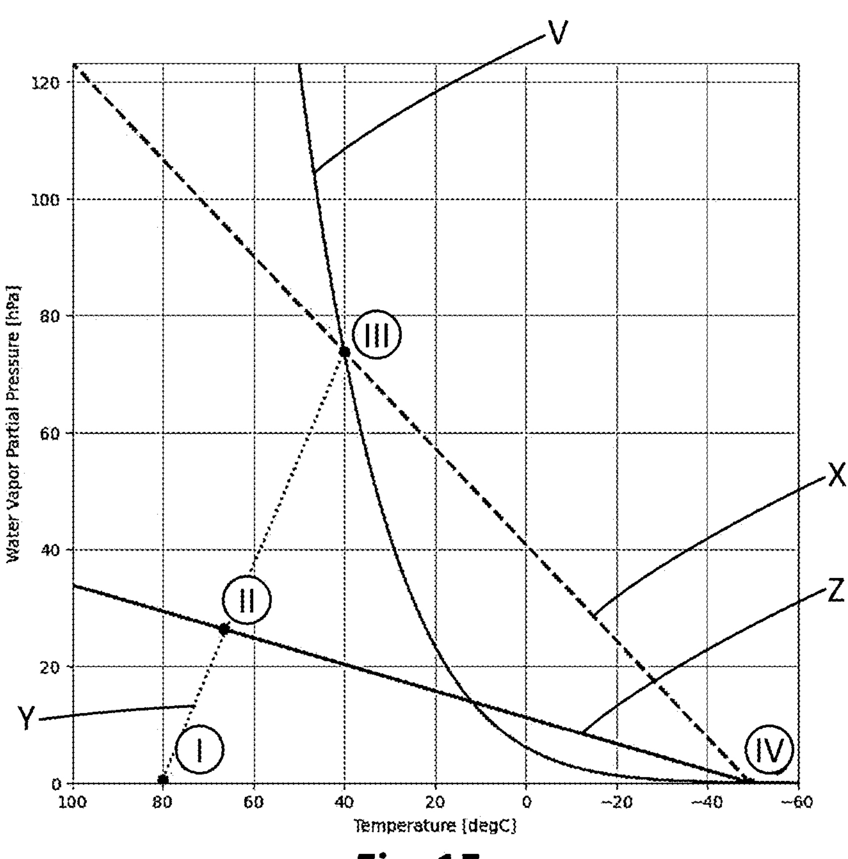
FIG. 15 is a schematic diagram showing plume mixing lines in the atmosphere.

FIG. 15 shows a schematic diagram showing plume 6 mixing lines in the atmosphere 7 represented by respective water vapor partial pressure as a function of the temperature. The narrow solid curve (line V) is the saturation pressure with regards to liquid water. The dashed line X represents the mixing of the humid exhaust E air at point III with the atmospheric air at point IV.

The mixing line X crosses the saturation line V. This means that all points on line X which are on the right hand side of line V are oversaturated. Mixing lines represent the ideal path the plume temperature and water vapor partial pressure would follow when mixing in the atmosphere 7, if no condensation occurs.

In FIG. 15, exemplary conditions of such a flow are represented by point III.

Point II is the result of the mixing of the humid exhaust air (point III) and the warm, dry flow (point I). The mixing process between these two flows is represented by the dotted line Y. The thick solid line Z represents the mixing line between the mixed exhaust state (point II) and the ambient air (point IV).

Figure 16:
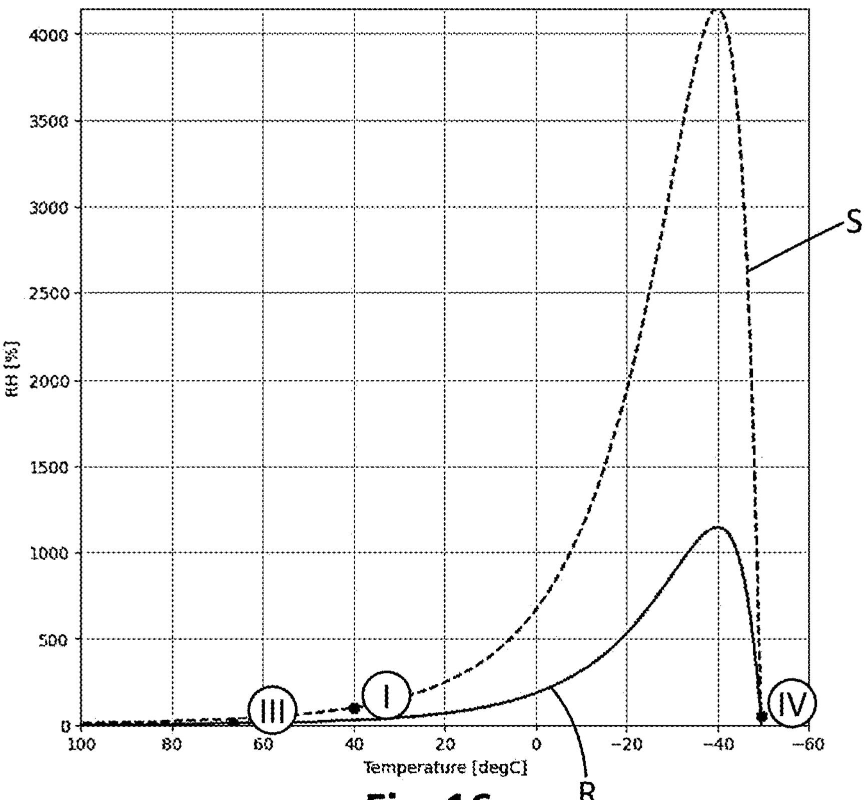
FIG. 16 is a schematic diagram of relative humidity within a plume while mixing in the atmosphere.

FIG. 16 shows a schematic diagram of relative humidity within a plume 6 while mixing in the atmosphere 7. The solid line R on FIG. 2 represents the evolution of a relative humidity R of the plume 6 as the exhausts E and further exhausts G (points III and I, respectively) mix with air under ambient atmospheric conditions (point IV). Obviously, in FIG. 2 the mixing line R (solid line) does not reach as far into the supersaturated region as the mixing line S (dashed line), which does not feature any contrail reduction solution. The maximum supersaturation is much smaller than without the contrail reduction solution. This means that fewer droplets are formed and less condensation occurs, resulting in a reduced contrail formation and climate risk. In short, the goal is to reduce the gradient of the mixing line S. The warmer, drier, and higher mass flow of the further exhaust G is, the stronger is the effect.

This principle also works for undersaturated and oversaturated humid exhaust flows. If the humid exhaust flow is saturated with droplets present, its conditions are placed right on the saturation line. In this case, the mixing with a warmer, drier flow causes the (partial) evaporation of droplets. Nevertheless, the gradient of the mixing line S with the ambient air is reduced. In a preferred embodiment, the flow of further exhausts G of the thermal management system 40 is mixed with the humid flow of exhausts E of the air supply system 41. In principle, other waste heat flows work as well, but the thermal management system 40 provides a large mass flow of dry, warm air, in close vicinity of the air supply system 41. Performing the mixing operation still within the aircraft 1 or at least just at respective exhaust outlets 13 and/or a combined exhaust outlet 13 for exhausts E and further exhausts G is preferred as it provides the best control over the mixing process.

Further alternative and/or additional embodiments of the presented solution may involve different air supply architectures, such as blowers instead of compressors, air from the cabin instead of from ambient, a nozzle instead of and/or in addition to the turbine 19, an electric motor on a shaft between the compression device 16 and the turbine 19, humidifiers, dehumidifiers, heat exchangers, etc. Different sources of liquid water W may be used, namely from a tank, from cabin systems, from a water separation device downstream of any point of the thermal management system 40 and/or air supply system 41. Multiple spray nozzles 23, or other means of generating disperse liquid water W may be located inside of the turbine 19 and/or inside of the fuel conversion device 11.

Sensors 32 may be applied to measure ambient conditions and/or to measure condensation and droplet sizes in the energy conversion arrangement 10. Furthermore, sensors 32 may be used to measure contrail occurrence and effectiveness of the contrail reduction device 20. Controls may be used to adapt the spray flow for different droplet sizes, constant-mode, active-mode, etc. Heating and/or cooling devices 30 may be used to adapt the liquid water temperature in order to reach a smaller droplet size.

The systems and devices described herein may include a controller, control unit, such as control unit 39, control device, controlling means, system control, other controls, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 aircraft
2 energy system
3 fuselage
4 hull
5 propulsion unit
6 plume
7 atmosphere
10 energy conversion arrangement
11 fuel conversion device
12 air inlet
13 exhaust outlet
14 flow path (air)
15 flow path (exhausts)
16 compressing device
17 expansion device
18 transmission line
19 turbine
20 contrail reduction device
21 water supply line/piping
22 pump
23 spray nozzle
25 air duct
30 heating device
31 catalytic converter
32 sensor
33 combustion chamber
34 heat exchange device
35 electric heating element
36 bypass duct
37 flow junction
38 switch valve/discharge valve
39 control unit
40 thermal management system
41 air supply system
42 mixing assembly
I warm, dry flow
II two exhausts mixing
III humid exhaust air
IV ambient air
d diameter
A air
B fuel
C Coagulated droplet
D Droplet
E exhausts
F travel direction
G further exhausts
H further air
K coolant
R mixing with contrail reduction
S mixing without reduction
V saturation pressure
W water
X saturation line
Y mixing line
Z mixing line

The invention claimed is:

1. An energy conversion arrangement for an aircraft, comprising:
- a fuel conversion device configured to convert at least one fuel to electrical energy, mechanical energy or both electrical energy and mechanical energy;
- an expansion device arranged in a flow path of exhausts produced in the fuel conversion device and configured to decompress the exhausts;
- a first exhaust outlet configured to let out the exhausts produced in the fuel conversion device by a conversion of fuel; and
- at least one bypass duct configured to allow the exhausts to bypass the expansion device as the exhausts flow from the fuel conversion device to the first exhaust outlet,
- wherein the bypass duct connects to at least one mixing assembly which is configured to mix the exhausts with further exhausts from the energy conversion arrangement and is arranged in the flow path of the exhausts, wherein the further exhausts are directed out of a second exhaust outlet and the mixing assembly comprises the first exhaust outlet and the second exhaust outlet, and wherein mixing of the mixing assembly takes place downstream of a location on the aircraft where the exhausts exit the aircraft,
- wherein the further exhausts exit a thermal management system and have a higher temperature or less relative humidity than the exhausts.

2. The energy conversion arrangement according to claim 1, wherein the bypass duct connects to the flow path via a junction.

3. The energy conversion arrangement according to claim 2, wherein the junction comprises at least one switch valve configured to switch the flow path between a first state where all of the exhausts are directed through the expansion device, a second state where all of the exhausts are directed through the bypass duct, and a third state where portions of the exhausts are directed through each of the expansion device and the bypass duct.

4. The energy conversion arrangement according to claim 3, wherein the switch valve is configured to provide gradual switching of the flow path.

5. The energy conversion arrangement according to claim 3, wherein the switch valve allows for a steplessly variable switching of the flow path.

6. The energy conversion arrangement according to claim 1, wherein the bypass duct ends in a vicinity of the first exhaust outlet.

7. The energy conversion arrangement according to claim 6, wherein the bypass duct ends within the first exhaust outlet.

8. The energy conversion arrangement according to claim 1, wherein at the first exhaust outlet, a flow path leading through the expansion device and a flow path leading through the bypass duct are joined.

9. The energy conversion arrangement according to claim 1, wherein a flow path leading through the expansion device and a flow path leading through the bypass duct are at least partially extending, terminating, or both at least partially extending and terminating in parallel, coaxially, or both in parallel and coaxially with respect to each other.

10. The energy conversion arrangement according to claim 1, further comprising at least one sensor configured to provide at least one measurement value representing at least one of temperature value, pressure value or humidity value of the exhausts, the energy conversion arrangement, or both the exhausts and the energy conversion arrangement.

11. The energy conversion arrangement according to claim 10, further comprising a control unit configured to adjust the flow path through the bypass duct based on the at least one measurement value.

12. The energy conversion arrangement according to claim 11, wherein the control unit is configured to keep the at least one measurement value within at least one of a pre-defined value range, above a predefined value limit, or below a predefined value limit.

13. An aircraft comprising the energy conversion arrangement according to claim 1.

* * * * *